United States Patent
Claessens et al.

(10) Patent No.: US 12,399,337 B2
(45) Date of Patent: Aug. 26, 2025

(54) FIBER OPTIC CABLE MANAGEMENT TRAYS; ASSEMBLIES; AND METHODS

(71) Applicant: COMMSCOPE TECHNOLOGIES LLC, Hickory, NC (US)

(72) Inventors: Bart Mattie Claessens, Hasselt (BE); Barry Wayne Allen, Siler City, NC (US); Dirk Jozef G. Van De Weyer, Beringen (BE); El Moïz Mohammed Michel Ghammam, Brussels (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 492 days.

(21) Appl. No.: 17/630,432

(22) PCT Filed: Jul. 24, 2020

(86) PCT No.: PCT/US2020/043396
§ 371 (c)(1),
(2) Date: Jan. 26, 2022

(87) PCT Pub. No.: WO2021/021595
PCT Pub. Date: Feb. 4, 2021

(65) Prior Publication Data
US 2022/0291470 A1    Sep. 15, 2022

Related U.S. Application Data

(60) Provisional application No. 62/879,314, filed on Jul. 26, 2019, provisional application No. 63/050,619, filed on Jul. 10, 2020.

(51) Int. Cl.
*G02B 6/44* (2006.01)

(52) U.S. Cl.
CPC .................. *G02B 6/4454* (2013.01)

(58) Field of Classification Search
CPC ..................................... G02B 6/4454
(Continued)

(56) References Cited

U.S. PATENT DOCUMENTS

| 5,185,845 A | 2/1993 | Jones |
| 5,323,480 A | 6/1994 | Mullaney et al. |

(Continued)

FOREIGN PATENT DOCUMENTS

| EP | 2 383 595 A1 | 11/2011 |
| EP | 2 535 750 A1 | 12/2012 |

(Continued)

OTHER PUBLICATIONS

International Search Report and Written Opinion of the International Searching Authority for International Patent Application No. PCT/US2020/043396 mailed Nov. 9, 2020, 9 pages.

(Continued)

*Primary Examiner* — Robert Tavlykaev
(74) *Attorney, Agent, or Firm* — Merchant & Gould P.C.

(57) ABSTRACT

A telecommunications assembly includes a tray, and telecommunications components. The telecommunications components include fiber routing modules selectively mountable in a plurality of positions to define different fiber pathways. Splice holder modules are used with the fiber routing modules. Attachment features between the tray and modules include a dovetail feature, and crush bumps, biased ends, and defined lengths to protect fibers being managed on the tray.

16 Claims, 36 Drawing Sheets

(58) Field of Classification Search
USPC .................................................... 385/135
See application file for complete search history.

(56) References Cited

U.S. PATENT DOCUMENTS

| | | | |
|---|---|---|---|
| 5,442,725 A | 8/1995 | Peng | |
| 5,566,269 A * | 10/1996 | Eberle, Jr. ............ | G02B 6/4454 |
| | | | 385/136 |
| 6,275,641 B1 | 8/2001 | Daoud | |
| 6,396,989 B1 | 5/2002 | Johnston et al. | |
| 6,424,782 B1 | 7/2002 | Ray | |
| 6,456,772 B1 * | 9/2002 | Daoud ................ | G02B 6/4471 |
| | | | 385/137 |
| 6,507,691 B1 | 1/2003 | Hunsinger et al. | |
| 6,584,267 B1 | 6/2003 | Caveney et al. | |
| 6,785,459 B2 | 8/2004 | Schmidt et al. | |
| 11,409,067 B2 | 8/2022 | Van Baelen et al. | |
| 2008/0112680 A1 | 5/2008 | McGranahan | |
| 2009/0136195 A1 | 5/2009 | Smrha et al. | |
| 2011/0044020 A1 | 2/2011 | Hruby et al. | |
| 2011/0268415 A1 * | 11/2011 | Fabrykowski ....... | G02B 6/4471 |
| | | | 385/135 |
| 2013/0105420 A1 * | 5/2013 | Ray .................... | G02B 6/4454 |
| | | | 29/559 |
| 2015/0241654 A1 * | 8/2015 | Allen .................. | G02B 6/4454 |
| | | | 385/135 |
| 2016/0103289 A1 | 4/2016 | Campbell et al. | |
| 2016/0161695 A1 | 6/2016 | Chen et al. | |
| 2016/0238811 A1 | 8/2016 | Simmons et al. | |
| 2017/0146762 A1 | 5/2017 | Campbell et al. | |
| 2017/0343757 A1 | 11/2017 | Giraud et al. | |
| 2018/0081139 A1 | 3/2018 | Geens et al. | |
| 2018/0372978 A1 | 12/2018 | Wentworth et al. | |
| 2020/0257072 A1 | 8/2020 | Wentworth et al. | |
| 2021/0181449 A1 | 6/2021 | Van Baelen et al. | |
| 2022/0221674 A1 | 7/2022 | Allen | |

FOREIGN PATENT DOCUMENTS

| | | | | |
|---|---|---|---|---|
| JP | WO 03/004912 A1 * | 1/2003 | ............... | F16J 15/10 |
| WO | 2019/160995 A1 | 8/2019 | | |
| WO | 2019/209643 A1 | 10/2019 | | |
| WO | 2020/198155 A1 | 10/2020 | | |

OTHER PUBLICATIONS

Extended European Search Report for Application No. 20847881.8 mailed Jul. 25, 2023.
Fiber Optic Splice Closure, FOSC-450-BS Installation Instruction, CommScope, TC-642-IP, Rev A, 16 pages (Feb. 2017).
Fiber Optic Splice Closure, FOSC 600 C and D Installation Instruction, CommScope, 16 pages (Apr. 2008).
Fiber Optic Splice Closure Trays: A and B Size, Installation Instruction For FOSC 400 or 450 A and B, AIR FOSC and FTerm AF Splice Closures, CommScope, 6 pages (May 2007).
Fibre Optic Splice Closure with integrated organiser system, FOSC-400A4 Installation Instruction, CommScope, TC-441-IP, Rev B, CommScope, 20 pages (Dec. 2018).
Pages from HellermannTyton, 6 pages (2015).
Splice Trays and Storage Baskets for FOSC-400 and FOSC-450 Splice Closures, Ordering Guide, CommScope, 8 pages (Dec. 2015).

* cited by examiner

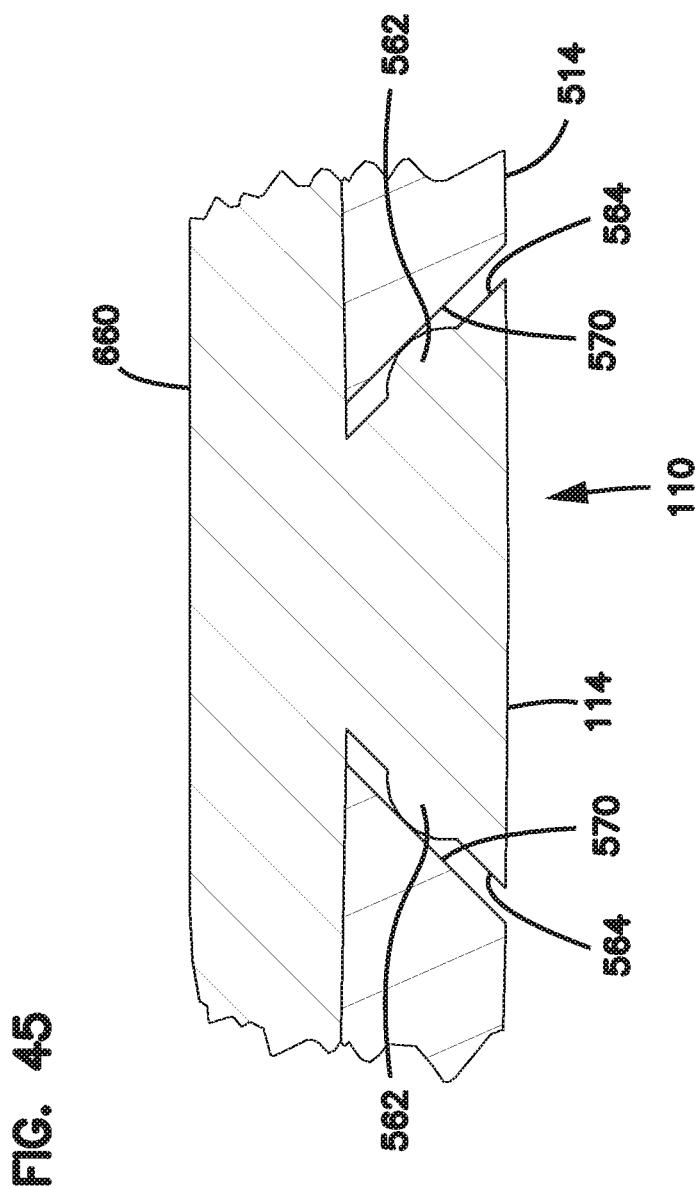

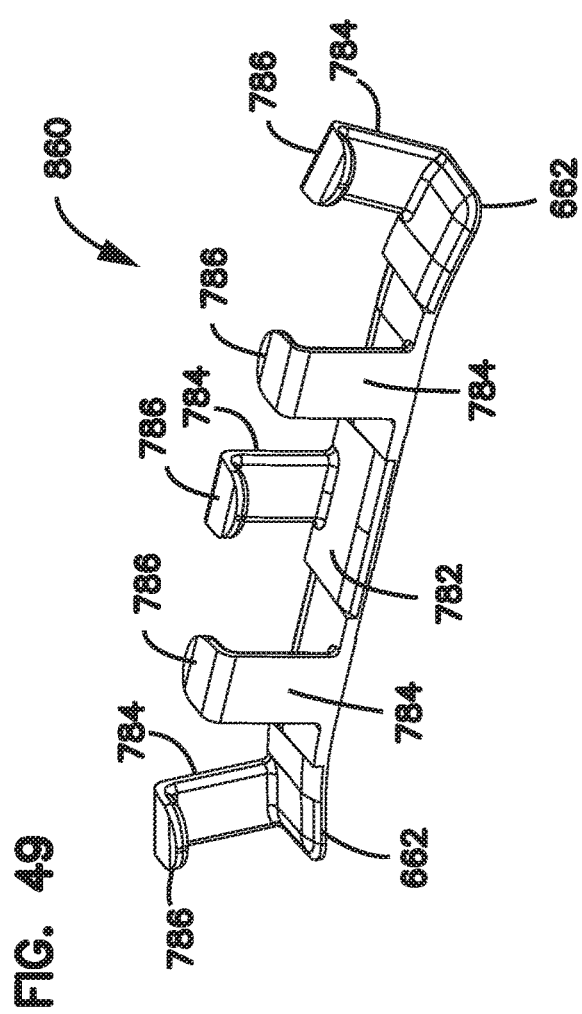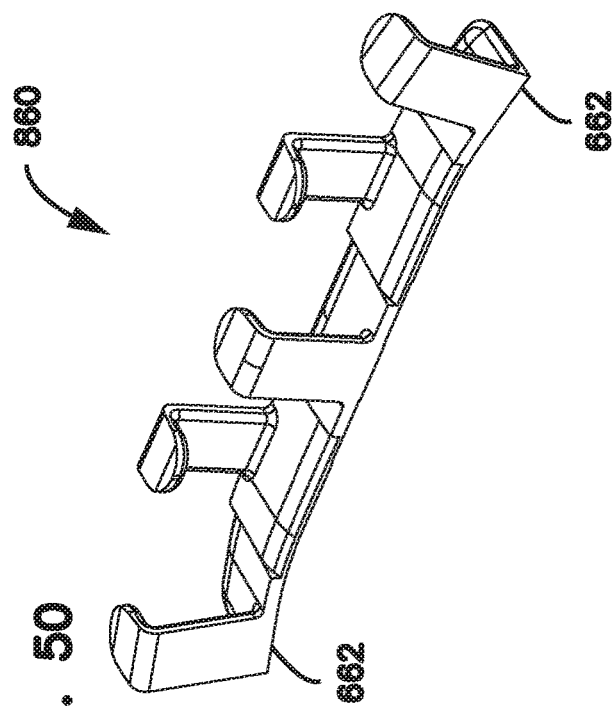

FIBER OPTIC CABLE MANAGEMENT TRAYS; ASSEMBLIES; AND METHODS

CROSS-REFERENCE TO RELATED APPLICATIONS

This application is a National Stage Application of PCT/US2020/043396, filed on Jul. 24, 2020, which claims the benefit of U.S. patent application Ser. No. 62/879,314, filed on Jul. 26, 2019, and claims the benefit of U.S. patent application Ser. No. 63/050,619, filed on Jul. 10, 2020, the disclosures of which are incorporated herein by reference in their entireties. To the extent appropriate, a claim of priority is made to each of the above disclosed applications.

TECHNICAL FIELD

The present disclosure relates generally to fiber optic telecommunications cable management trays and components. More particularly, the present disclosure relates to devices, systems and methods for storing fiber optic cables, such as loops of fiber optic cable slack and components.

BACKGROUND

Telecommunications systems, for example fiber optic closures and other devices, can involve the storage of fiber optic cable components such as splices, splitters, or other devices, and the accompanying fiber optic cable connecting to those components. Slack management is important, especially with respect to splicing. The slack fiber optic cable is needed for accessing the fusion splicing equipment to connect the two fibers. Excessive slack is not a preferred situation in that such slack takes up more space and/or needs to be organized and managed.

In the case of a repair of fiber optic connections, such as a re-splice, additional issues arise with respect to managing the slack. If a repair technician is required to re-route fiber optic cables inside or outside of the closure to locate additional slack to make the repair, such events can be time consuming or costly.

Additionally, the overall size of outside plant closures in general, and repair closures in particular, may be limited. For example, there may be size limits so the closures do not hinder placement in the field. Therefore, if the internal slack storage is limited in space it may limit the technician's ability to properly manage short lengths of spliced fiber required in these smaller closures.

Improvements are desired.

SUMMARY

This disclosure pertains to fiber optic tray systems used by telecommunication closures of the type found in the outside plant. For example, some tray systems utilize fusion splice holder modules to organize and protect spliced optical fibers stored on the trays. These modules have also been integrated with optical components such as WDM and splitters. The trays can also be used in other devices, such as inside plant.

In one example, the CommScope, Inc. FOSC line of splice trays are configured to receive and retain a splice holder module. The trays and modules are provided with compatible attachment features that allow for the modules to be mounted to the trays.

This disclosure also pertains to fiber optic routing of the fiber optic cables in an organized manner within a fiber optic tray or other device where fiber slack needs to be stored relative to the splices.

This disclosure pertains to management of fiber optic slack in a manner where the fibers are managed without going below the minimum bend radius of the respective cable.

This disclosure relates to managing fiber optic cables wherein the slack lengths to be managed may vary between the different fiber optic cables being managed by the fiber optic tray or other device.

This disclosure further pertains to management of fiber optic cable slack in a manner where the fibers are connected to other fibers or devices on both ends, and the slack is managed in loop shapes without having unmanaged segments that can interfere with other cables, get damaged, or create organization and/or use problems for the technician.

This disclosure includes cable management devices provided on a substrate for containing one or more fiber loops, and are mounted to the substrate at a desired spacing to take into account the desired pathways of the stored cable.

In one embodiment, the cable management devices are provided with a base, and management tabs. The cable management device can be constructed with a base, sidewalls, and overhanging tabs. Alternatively, two uprights are on one side of the base, and one upright is on an opposite side of the base. Additional uprights can be added.

The trays, the management devices, and the component modules (for example, splice holders) are provided with compatible attachment features that allow for the management devices and modules to be mounted to the trays. These trays can also include both the cable management devices for managing the fiber loops and the component modules, or those trays can be separate from the component modules on other trays.

The management devices and component modules are selectively positionable on the substrate to allow for section of desired fiber pathways for the fibers to be managed.

The management devices and component modules can include one or bumps on attachment features to promote a tighter fit with the tray to help reduce or eliminate a gap that could catch a fiber. In one example, the one or more bumps can be provided on a surface of a dovetail of the attachment features which faces toward a base of the management devices and component modules.

The management devices and component modules can include a downward bias on the ends or edges to help reduce or eliminate a gap between the management devices and component modules that could catch a fiber.

The management devices can be provided as long or longer relative to the component modules or other components to help ensure that a fiber does not catch on the edge of the component modules or other component, or to help ensure that a fiber does not go under the component modules or other component.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 37-46A are various views of another one of the fiber optic cable routing modules shown in the tray of FIGS. 31 and 32;

FIGS. 49-52 are various views of a still further one of the fiber optic cable routing modules shown in the tray of FIGS. 31 and 32;

DETAILED DESCRIPTION

Figure 1:
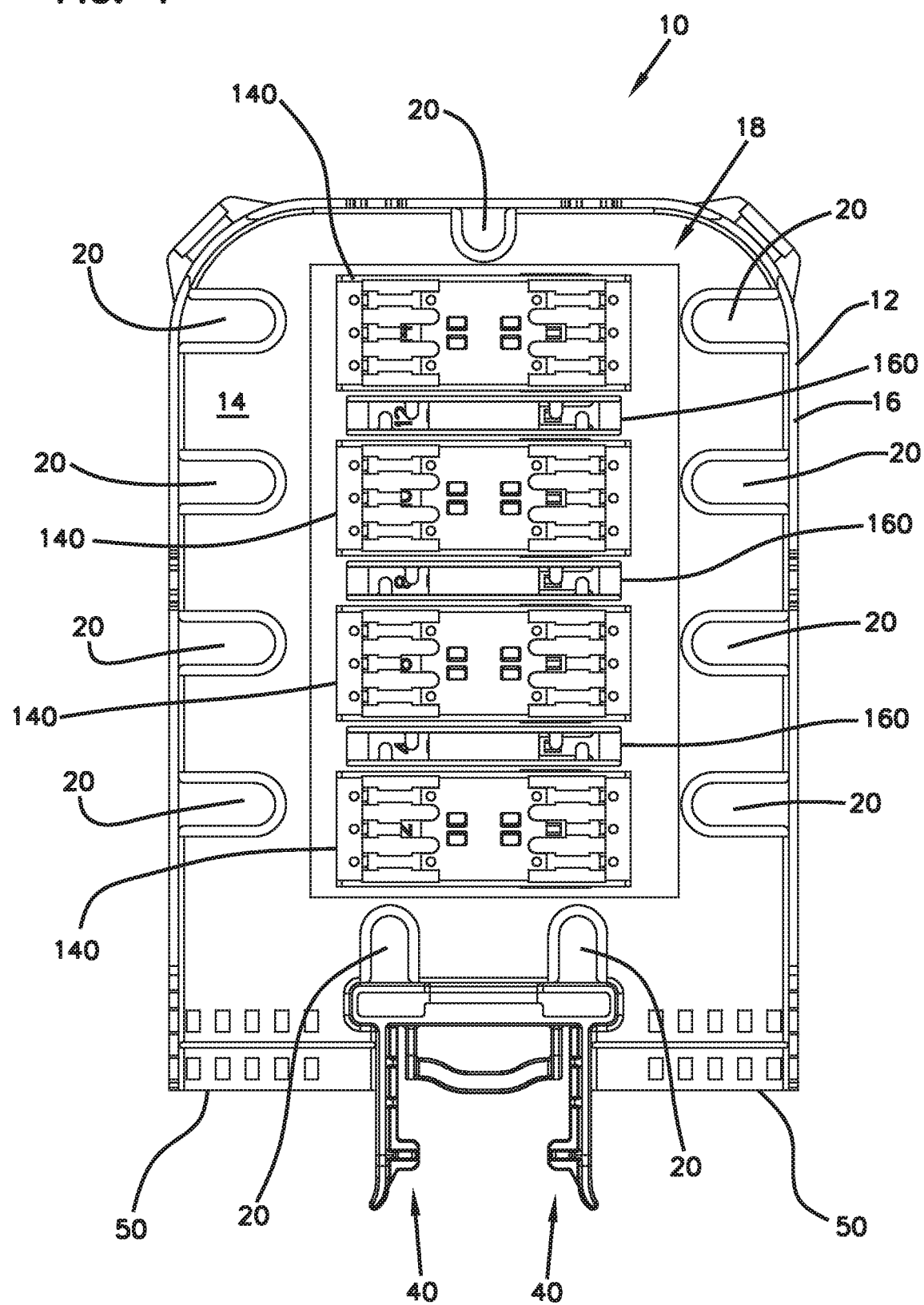
FIG. 1 is a top view of a first embodiment of a fiber optic tray.
Figure 2:
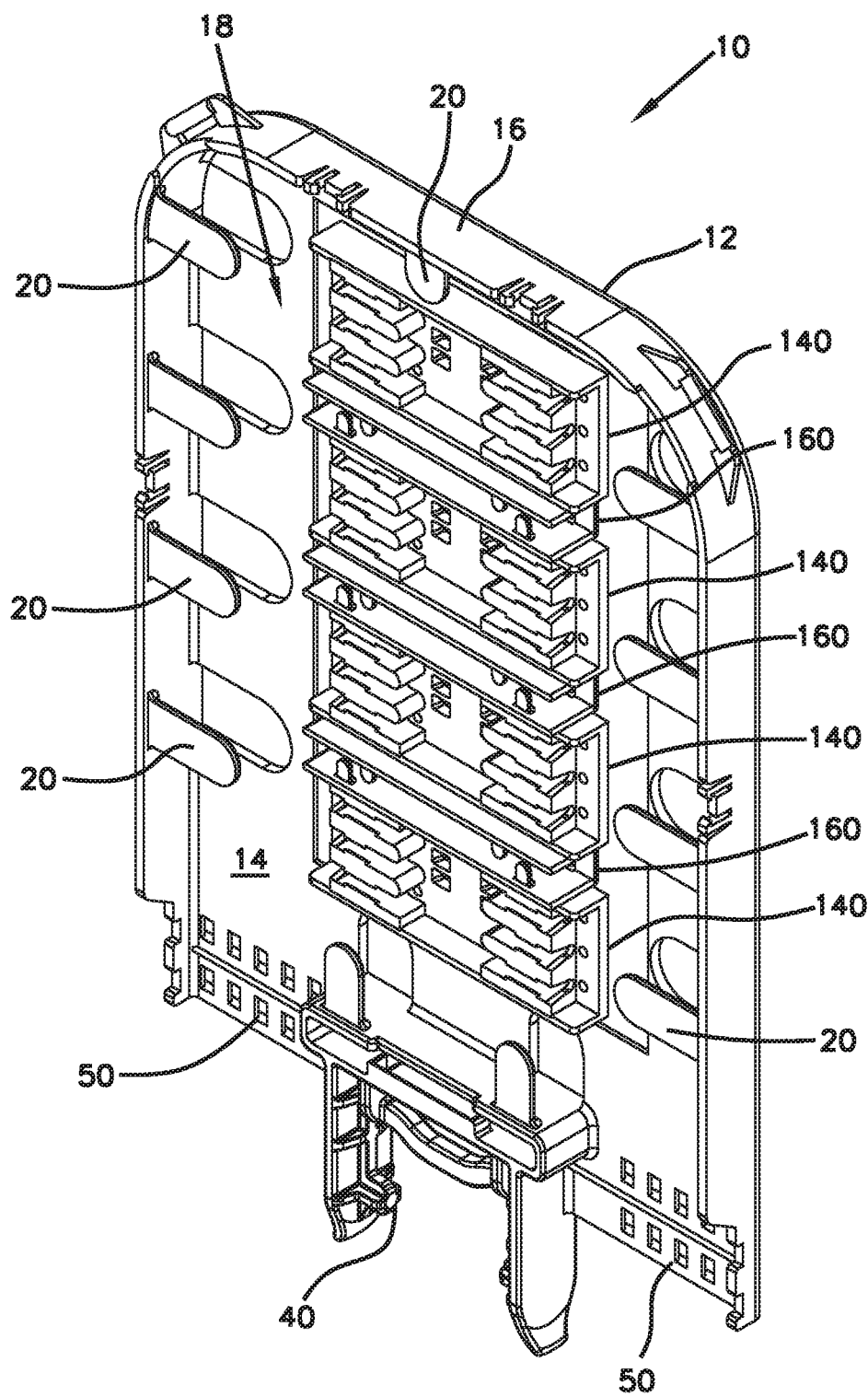
FIG. 2 is a perspective view of the fiber optic tray of FIG. 1.
Figure 3:
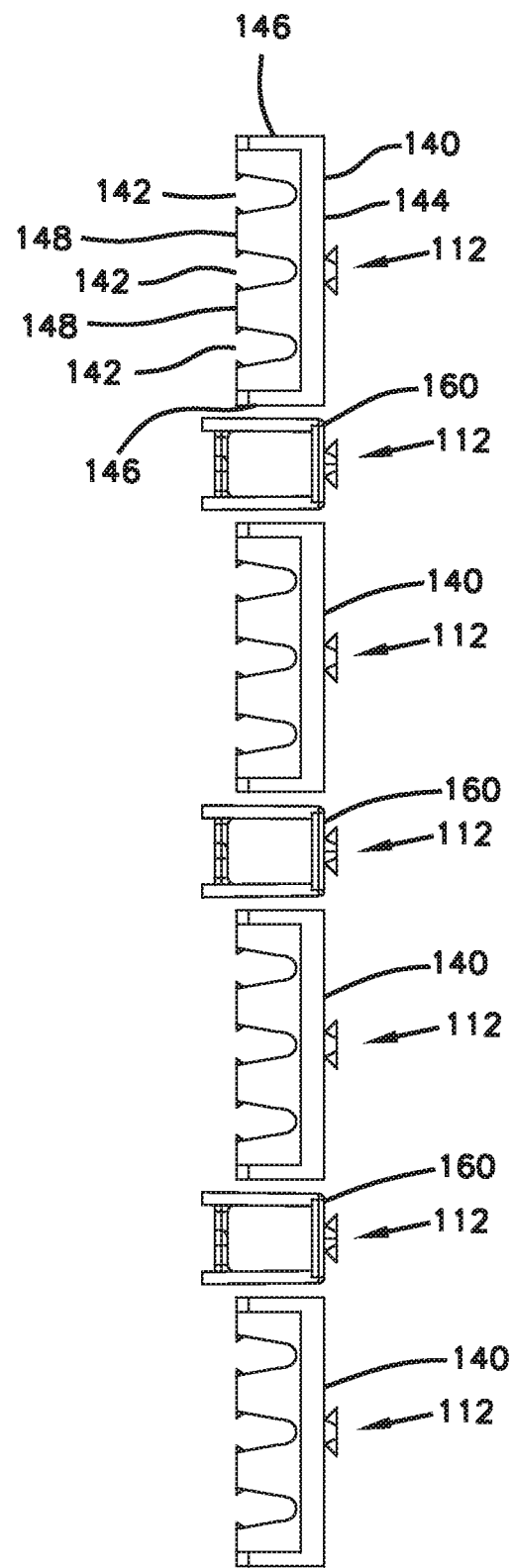
FIG. 3 is a side view of the components mounted to the fiber optic tray of FIG. 1.
Figure 4:
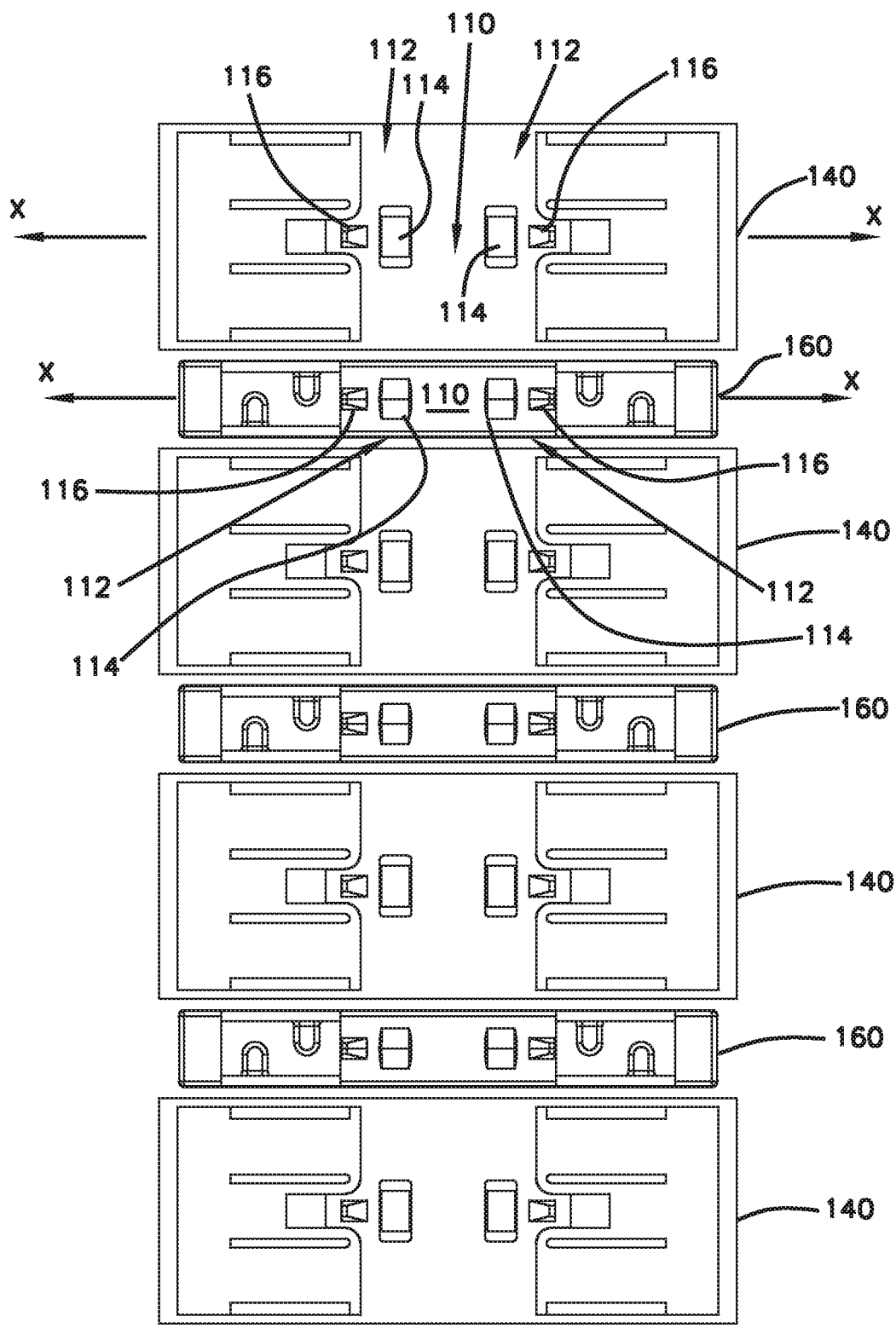
FIG. 4 is a bottom view of the components shown in FIG. 3.
Figure 5:
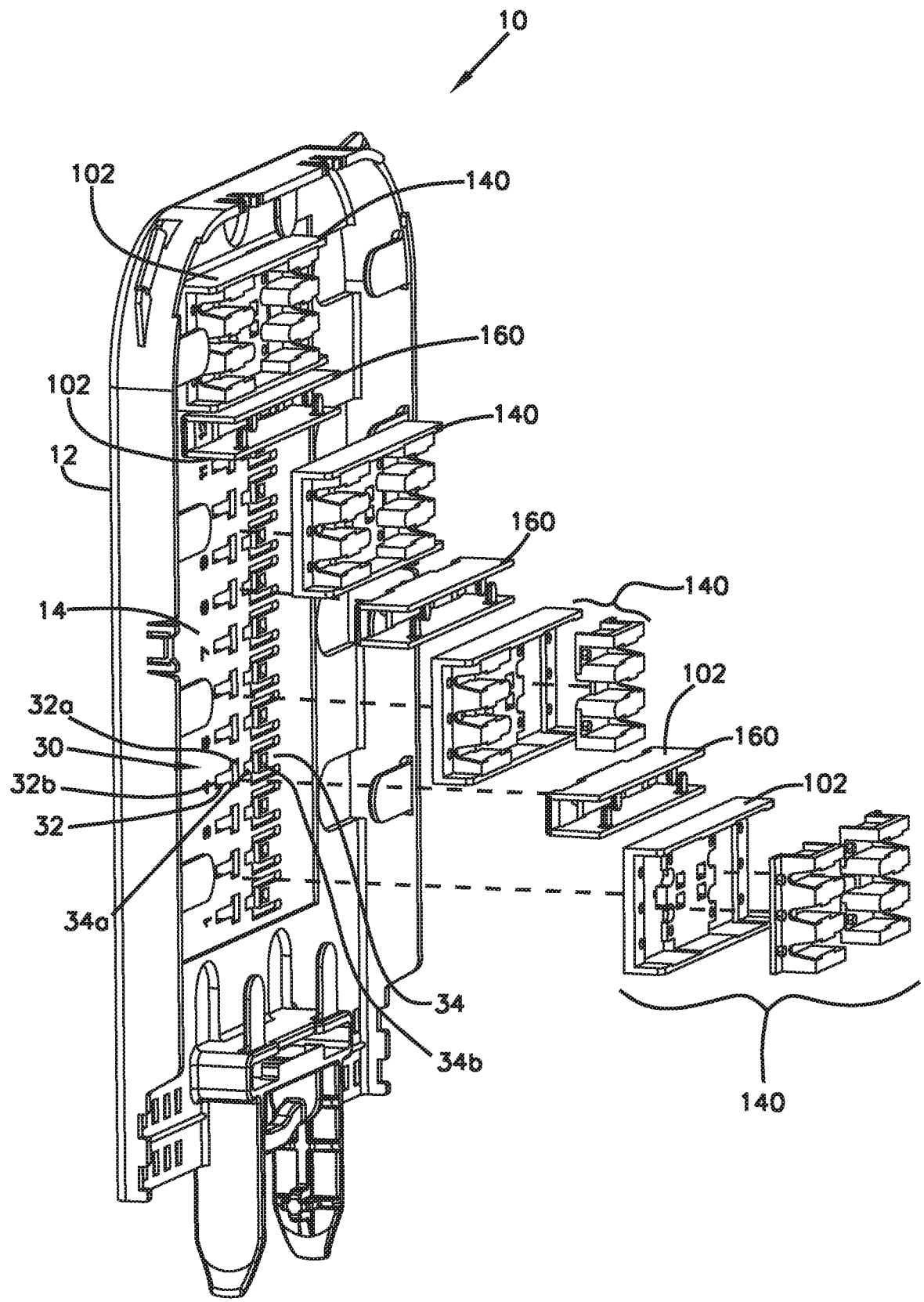
FIG. 5 is an exploded perspective view of the fiber optic tray of FIG. 1.

Referring to FIGS. 1 to 6, a telecommunications arrangement 10 is shown in various configurations. In one aspect, the telecommunications arrangement includes a tray 12 for storing telecommunications components and fiber optic cabling. As shown, the tray 12 includes a base wall 14 and a circumferential sidewall 16 to define an interior volume 18. To retain fiber optic cables within the tray, extension tabs or members 20 can be provided. In the example shown, a plurality of extension tabs 20 are provided extending from the sidewall 16 over the interior volume 18 and in a direction parallel to the base wall 14. Tray 12 defines hinge pins 40 to allow the tray to be hinged to a support structure, such as a tower, possibly with other trays 12.

The tray 12 is also shown as including a plurality of attachment arrangements 30 arranged in an array extending the length of the tray 12 along the base wall 14. The attachment arrangements 30 are configured to receive and retain various telecommunications components or devices, such as fiber routing modules, fiber optic adapters, splice holders, optical splitters, wavelength division multiplexers (WDM), and the like that are provided with an attachment arrangement compatible with the attachment arrangements 30. As shown, a splice holder device 140 and a fiber routing device 160 are used in various selectable positions to define selectable fiber routing pathways.

In one aspect, each attachment arrangement 30 of the tray includes a pair of connection points 32, 34. The first connection point 32 is configured as a t-shaped opening in the base wall 14. The second connection point 34, arranged oppositely from the first connection point 32, is configured with a first opening 34a into which a cantilevered tab 34b extends. Similarly constructed attachment arrangements for use with interconnecting telecommunications components are shown and described in Patent Cooperation Treaty (PCT) Application Serial Number PCT/US2019/17904, filed on Feb. 13, 2019, the entirety of which is incorporated by reference herein; Patent Cooperation Treaty (PCT) Application Serial Number PCT/US2019/028245, filed on Apr. 19, 2019, the entirety of which is incorporated by reference herein; and U.S. Provisional Patent Application Ser. No. 62/824,824, filed on Mar. 27, 2019, the entirety of which is incorporated by reference herein.

The attachment arrangements 30 are arranged in a linear array in the example tray 12. An example pitch of 7.7 mm is shown. Not all attachment arrangements 30 may be used. Some devices, such as splice holders 140 span multiple arrangements 30.

In one aspect, the attachment arrangement 110 on each device 140, 160 is configured with a pair of attachment features 112, each including a pair of oppositely arranged dovetail structures 114 and ramp structures 116. Accordingly, the main body 102 can be attached to a pair of attachment arrangements 30 of the tray 12. It is also noted that the pairs of dovetail and ramped structures 114, 116 are symmetrically arranged such that the device is symmetrical about a longitudinal axis X. With such a configuration, the devices 140, 160 can be easily mounted to the tray 12 in either orientation.

As shown, each of the ramp structures 116 includes a ramped surface 116a and a stop surface 116b. As configured, the attachment arrangement 110 can be connected to the attachment arrangement 30 by aligning the main body bottom side 102b with the base wall 14 such that the dovetail structures 114 and ramp structures 116 drop into the openings 32a, 32b of the connection point 32 and the opening 34a of the connection point 34. From this position, the main body 102 can be displaced laterally in a direction towards the cantilevered tab 34b until the tab snaps over the ramped surface 116a and abuts the stop surface 116b. In this position, the connection arrangements 110, 42 are fully interconnected. The U.S. Ser. No. 62/824,824 application describes a generally similar connection arrangement between two components.

As shown in the Figures, a tray 12 is shown with a plurality of fiber optic splice holder modules 140 mounted to tray 12. A plurality of fiber routing modules 160 are also shown mounted to the tray. The fiber routing modules can be positioned as desired on tray 12 for managing fiber optic cables extending to and from the splices of the splice holders 140. Fiber routing modules 160 have generally planar exterior side walls or side projections. An inner trough area is constructed to retain one or more fibers passing through the interior passage. Similarly, splice holders 140 have generally planar vertical exterior sidewalls or side projections to allow for side by side placement with other splice holder modules 140 or fiber routing modules 160. As shown in the Figures, the fiber routing modules can have a variety of constructions for the fiber retention features.

The tray 12 is shown with either splice pathways or fiber slack pathway along the full middle length between pathways A and C.

Other telecommunications components can be mounted to tray 12 including splitter modules. The splitter modules can be mounted instead of splice holder modules 140 or in combination with splice holder modules 140. The fiber routing modules 160 can be used to guide fibers to and from the splice holder modules 140, and the splitter modules, or other components on tray 12. Different cable bundles can be segregated by using different routing modules 160.

The attachment arrangements 30 in the form of the dovetail and corresponding slots allows for flexibility in the arrangement of the components on tray 12. Trays can be customized for different fiber arrangements depending on the nature of the components stored on the tray. Further, the locations of the fiber routing modules 160 can be selected upon desired locations for managing the different fiber loops between incoming and outgoing fibers.

Figure 6:
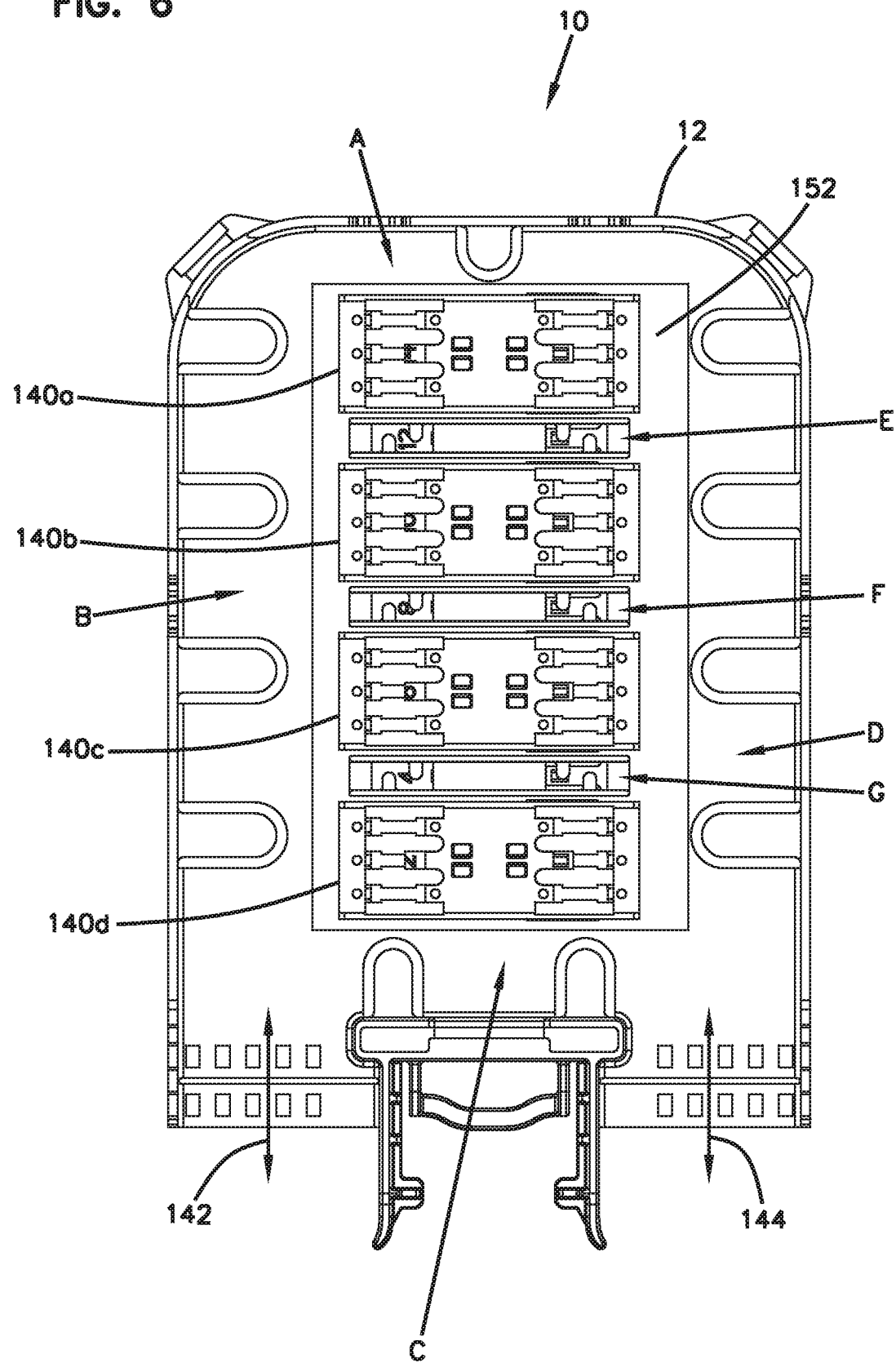
FIG. 6 is a top view like FIG. 1, showing example fiber routing pathways.

FIG. 6 shows various routing pathways. Cables enter and exit tray 12 at ports 142, 144. The cables can pass around the exterior of a middle region defined by pathways A, B, C, D.

Middle region 152 receives individual fibers and components. Therefore, there is a need to manage various fibers without having to always be restricted to pathways A, B, C, D. Instead, as shown in FIG. 6 additional pathways E, F, and G are provided in the illustrated example to facilitate additional fiber management with respect to telecommunications devices 140*a*, 140*b*, 140*c*, 140*d*.

Figure 6A:
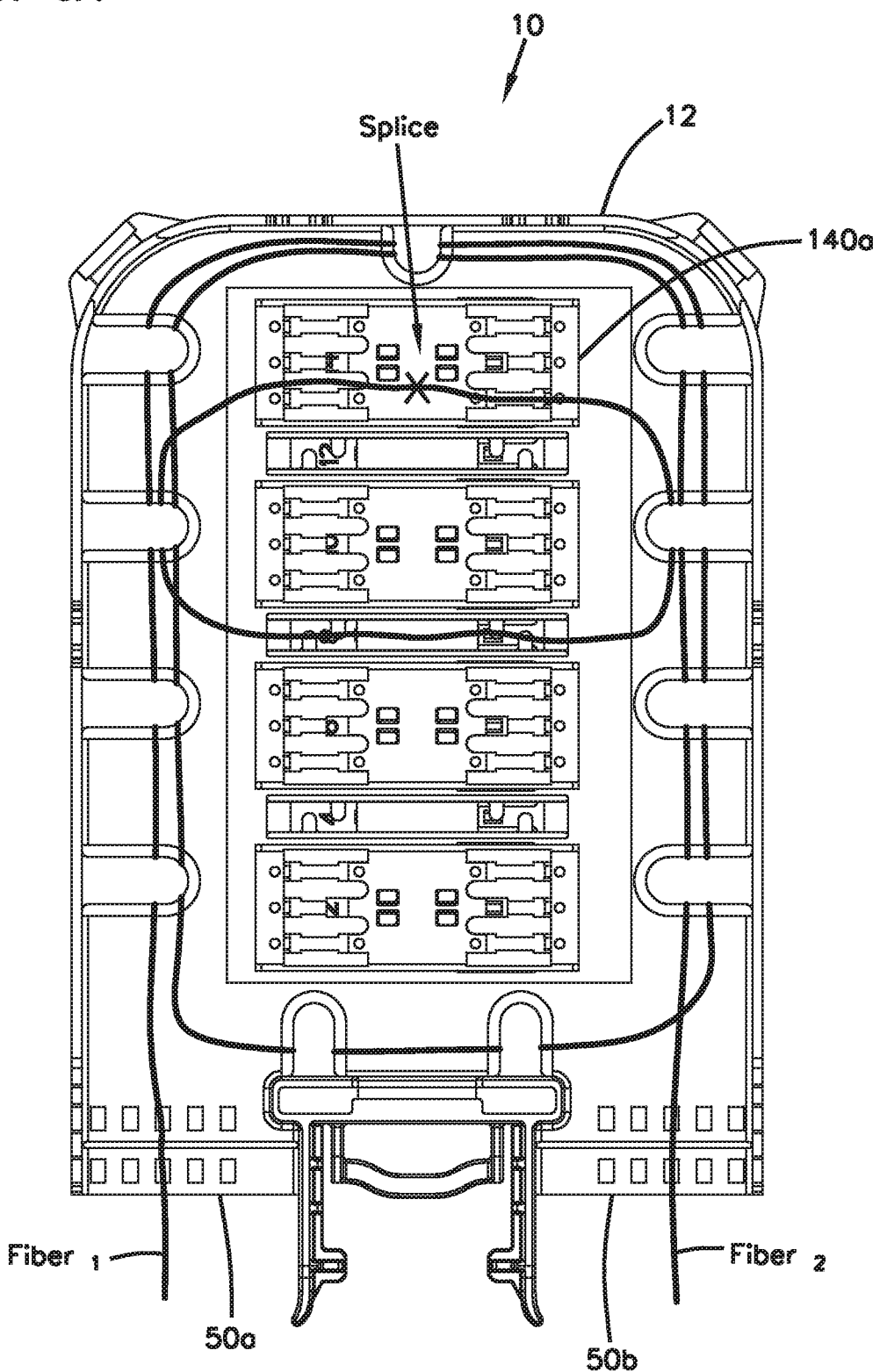
FIG. 6A shows example fibers and fiber pathways.

FIG. 6A shows a fiber 1 and a fiber 2 entering and exiting tray 12 and being connected at a splice on splice holder 140*a*. Fiber 1 can be tied off at 50*a* and fiber 2 can be tied off at 50*b*. The various pathways are utilized to store the fiber lengths necessary to be managed by tray 12. Additional loops can be managed by tray 12. In the example of FIG. 6A, only a few loops are shown for illustration purposes. Additional loops and/or different pathways can be utilized.

Figure 6B:
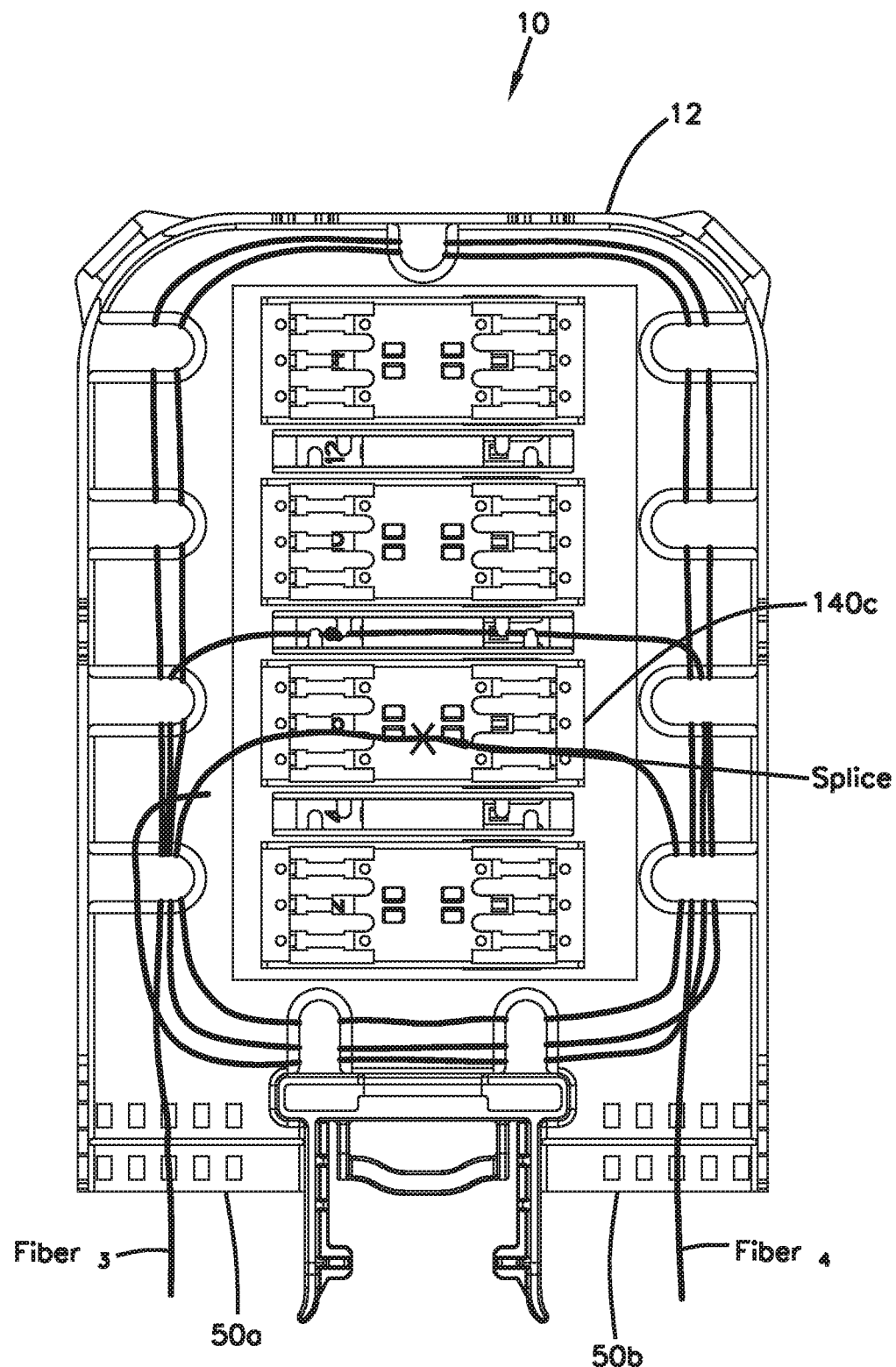
FIG. 6B shows other example fibers and fiber pathways.

FIG. 6B shows a different fiber routing arrangement for fiber and fiber 4. These fibers are spliced on splice holder 140*c*.

Figure 7:
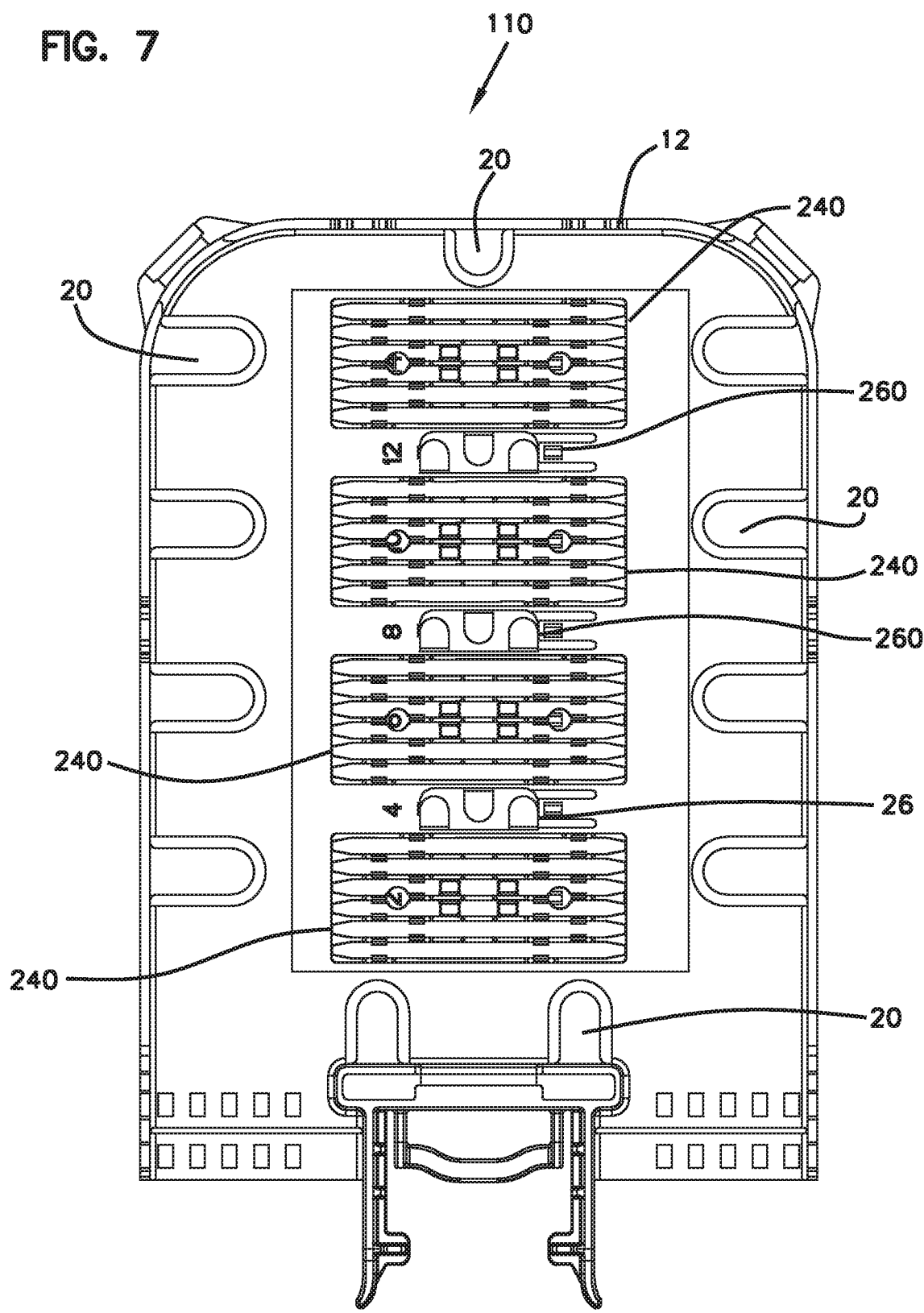
FIG. 7 is a top view of a second embodiment of a fiber optic tray.
Figure 8:
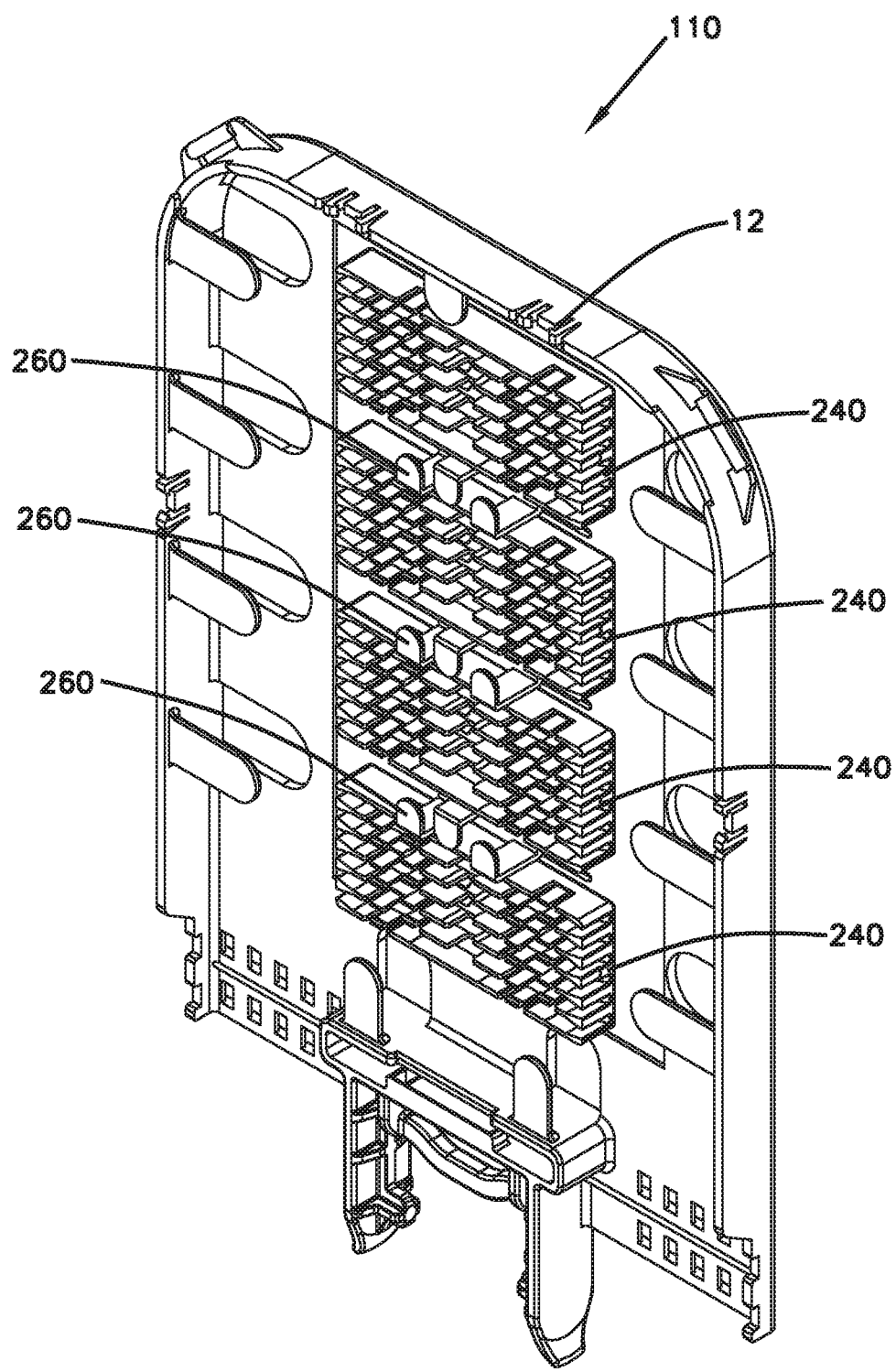
FIG. 8 is a perspective view of the fiber optic tray of FIG. 7.
Figure 9:
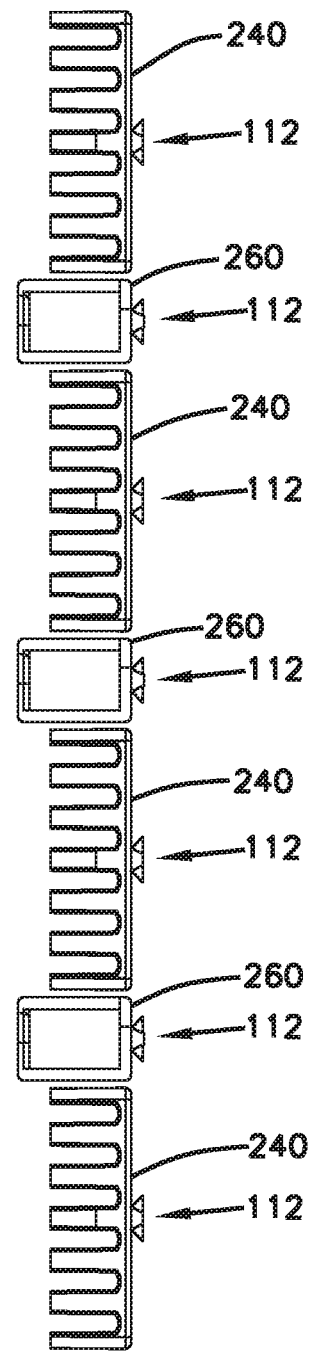
FIG. 9 is a side view of the components mounted to the fiber optic tray of FIG. 7.
Figure 10:
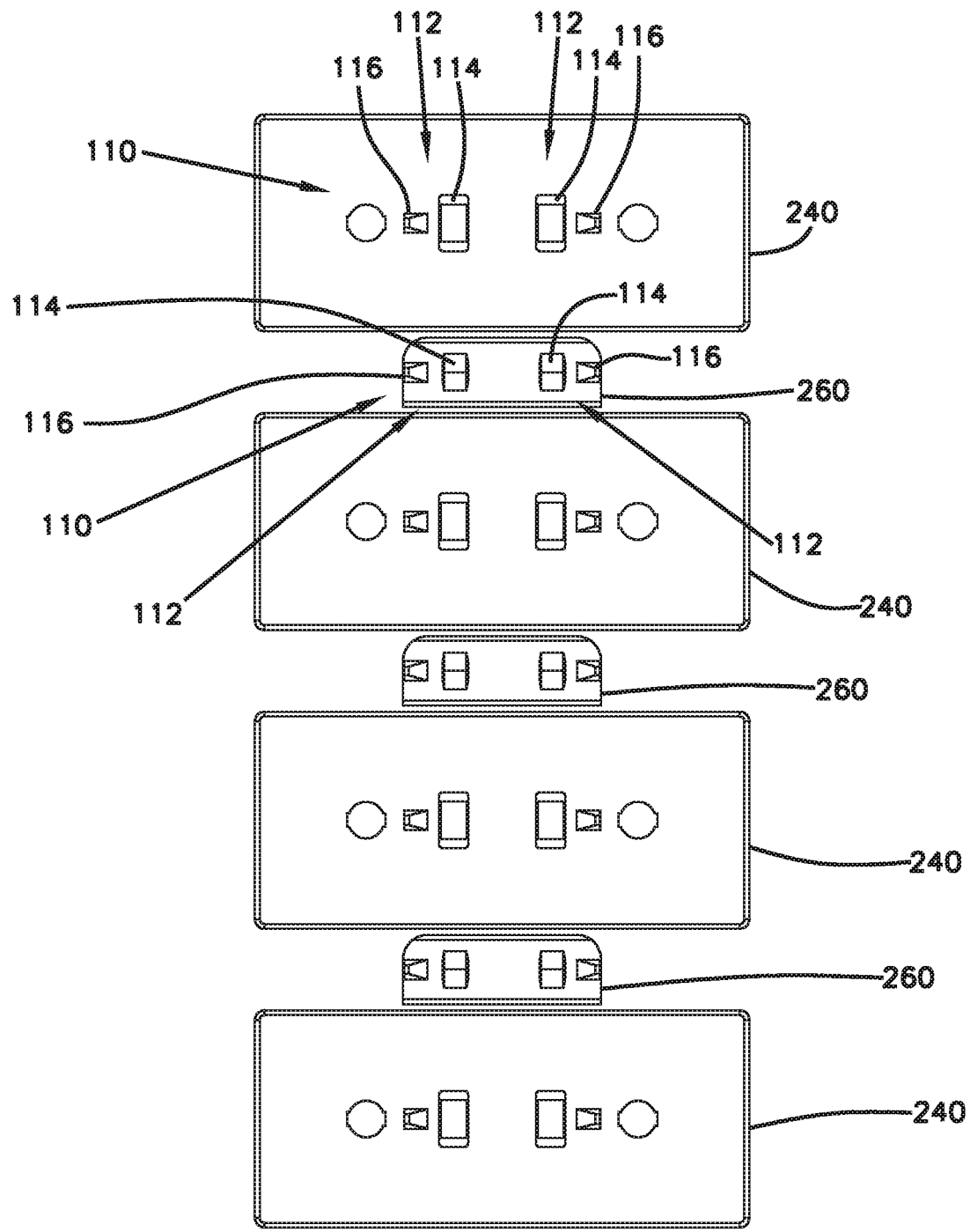
FIG. 10 is a bottom view of the components shown in FIG. 9.
Figure 11:
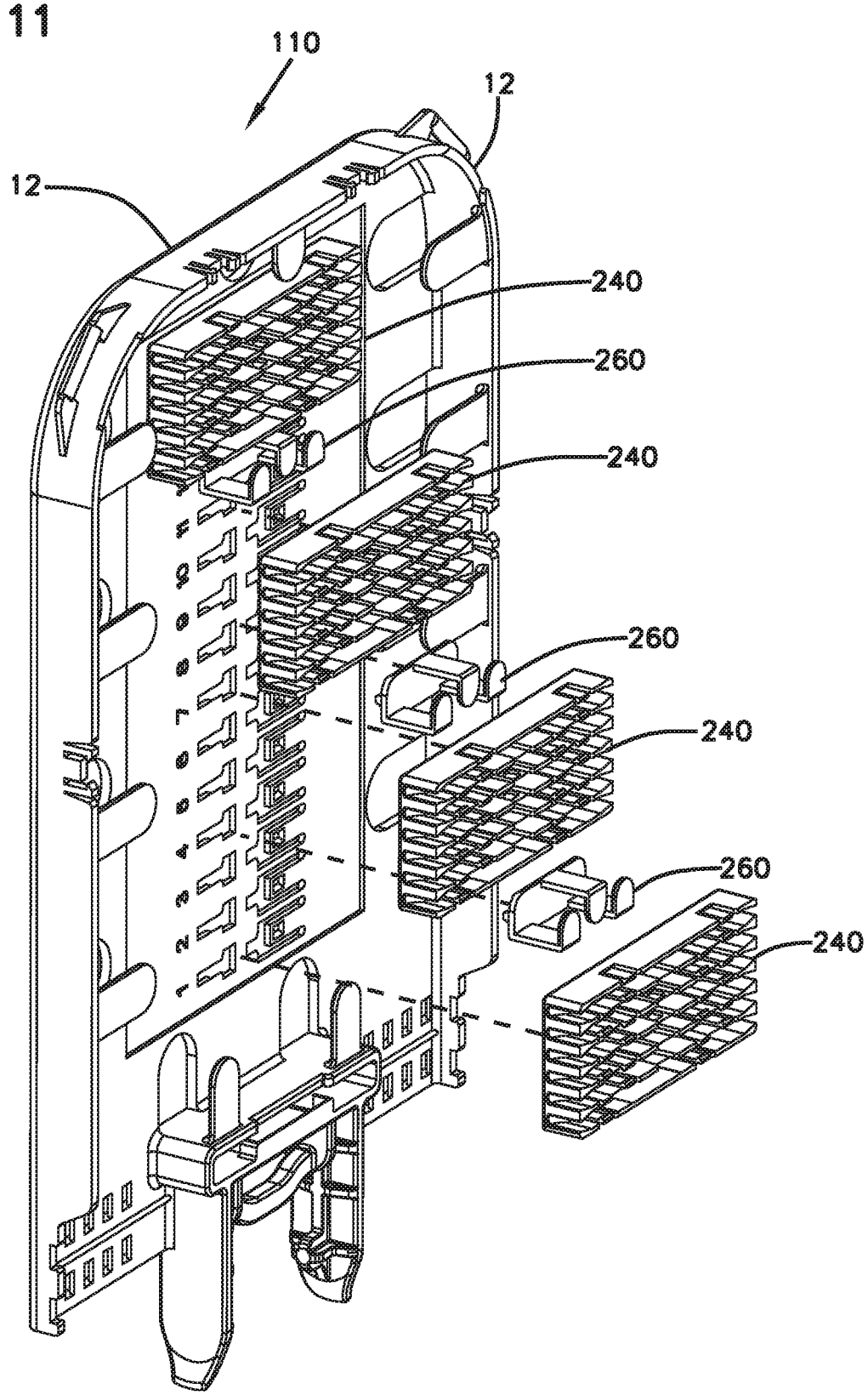
FIG. 11 is an exploded perspective view of the fiber optic tray of FIG. 7.

Referring now to FIG. 7, tray 12 is shown with different splice holders 240, and different fiber routing modules 260. However, the concepts of FIGS. 1-6, 6A, 6B are similar in that various fiber routing pathways can be selected and organized as desired.

Figure 12:
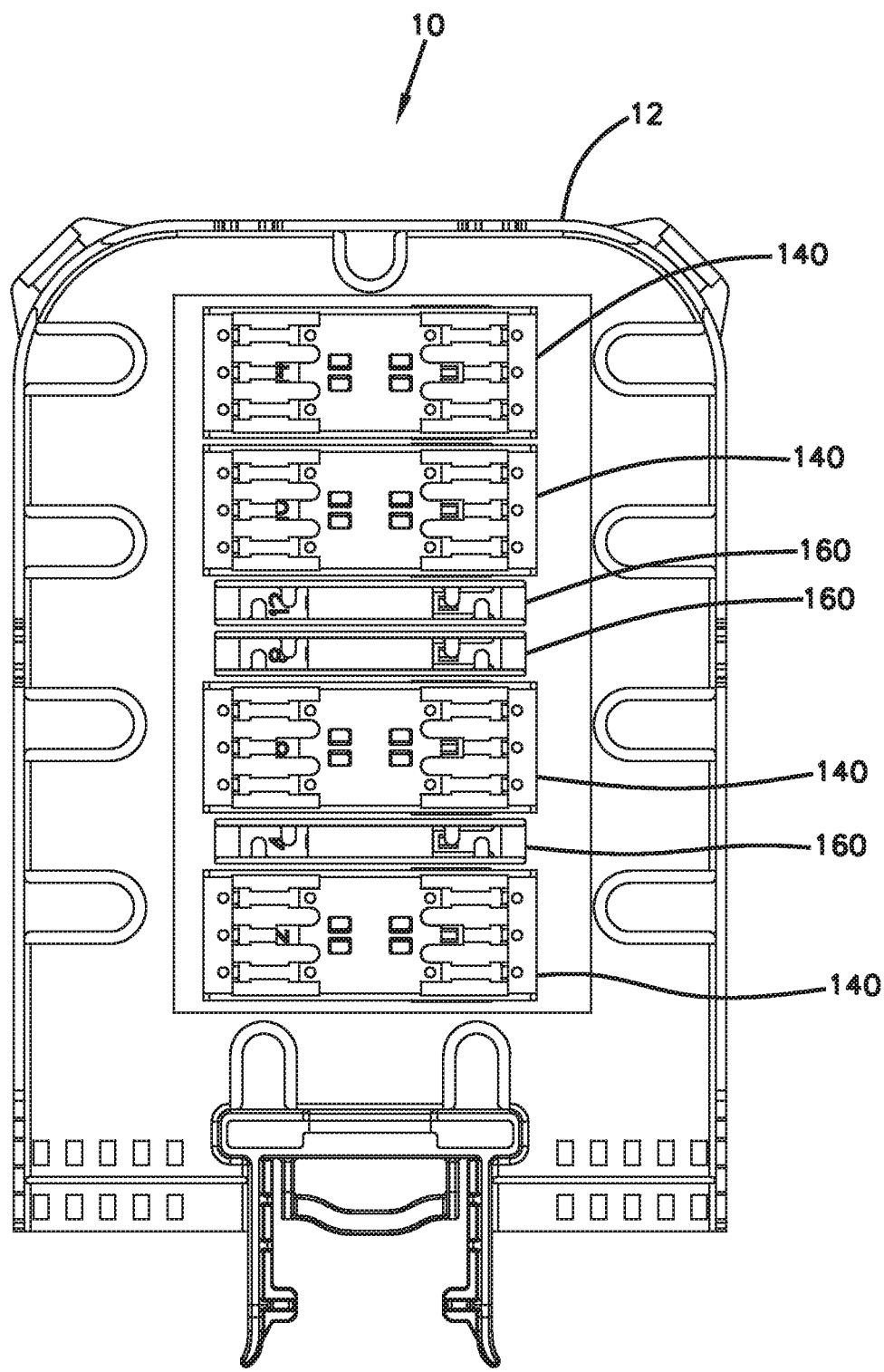
FIG. 12 is a top view like FIG. 1, showing different fiber routing pathways.
Figure 13:
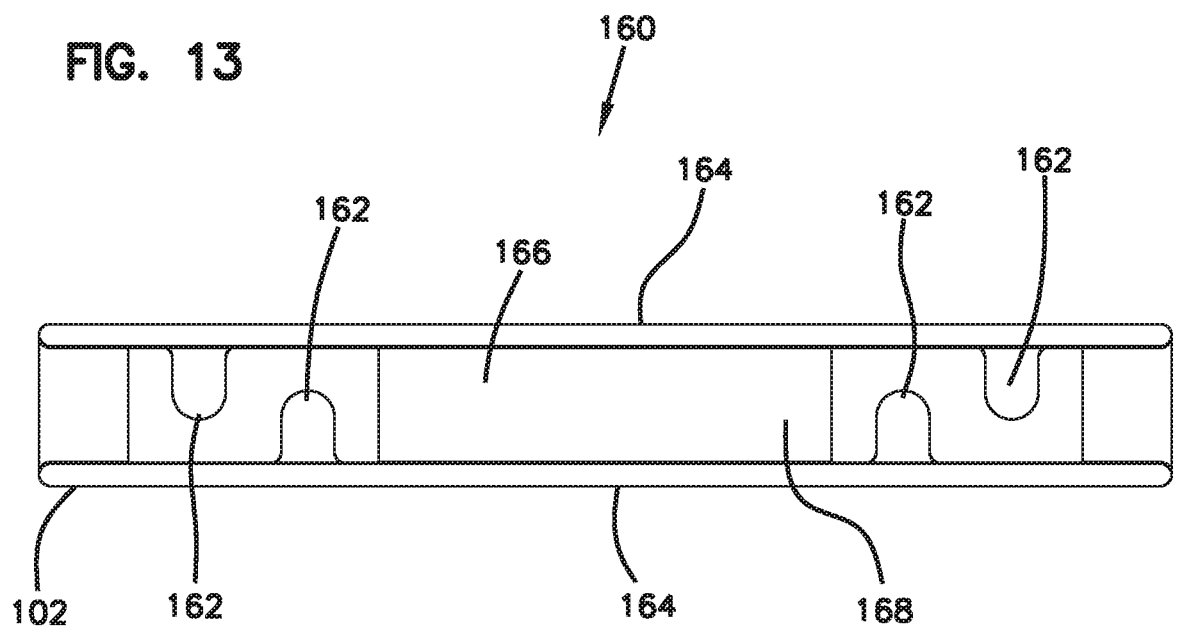
FIGS. 13-18 are various views of the fiber optic cable routing module used in the trays of FIGS. 1-6, 6A, 6B and 12.
Figure 14:
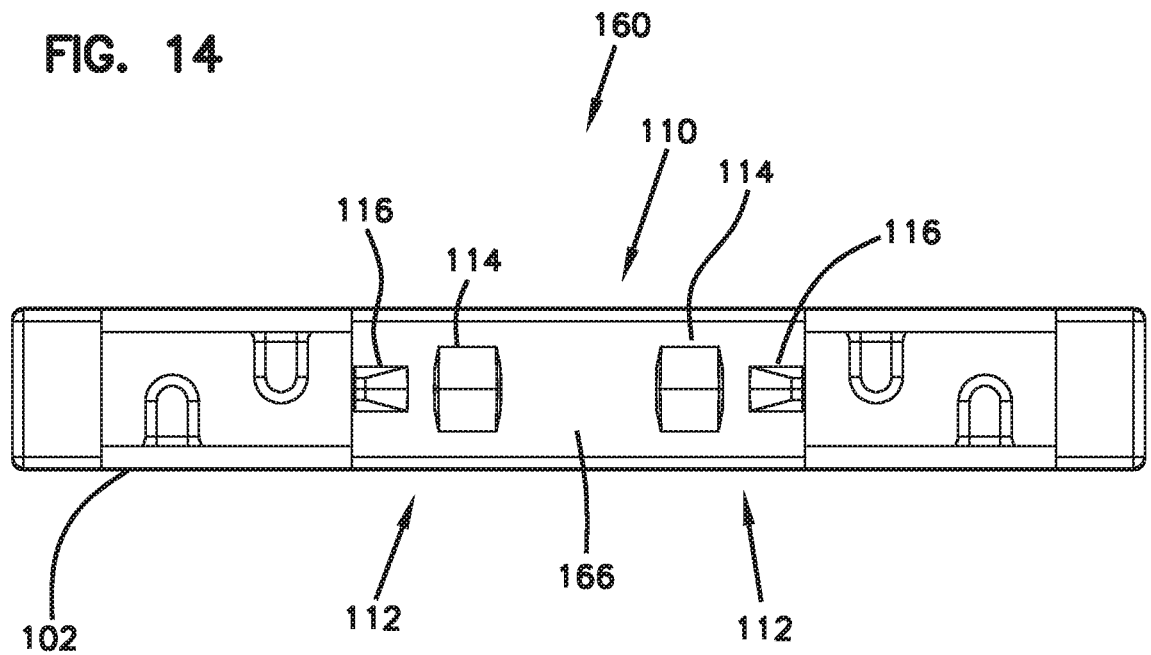
Figure 15:
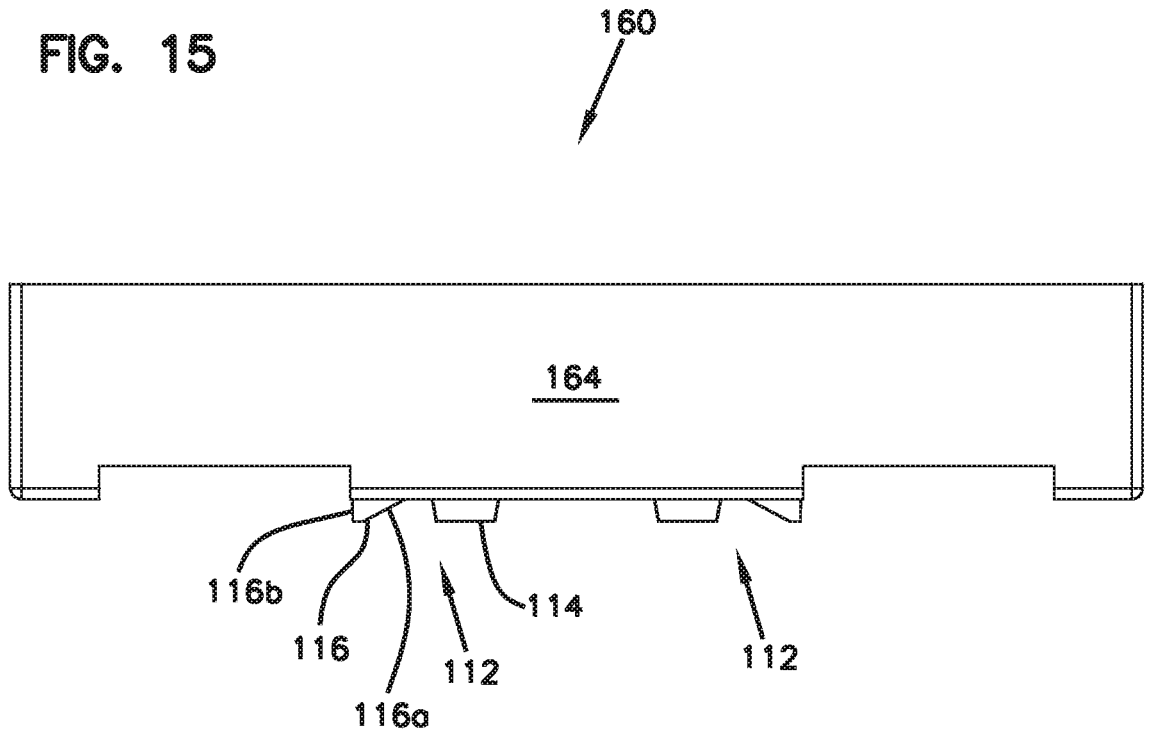
Figure 16:
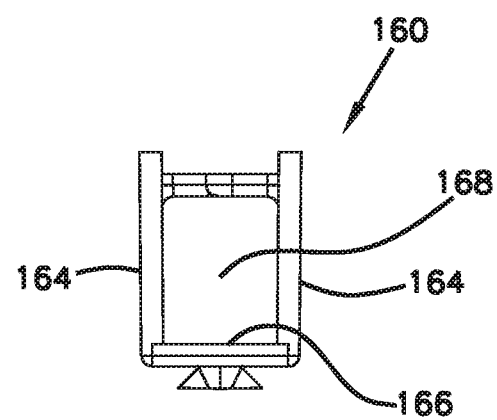
Figure 17:
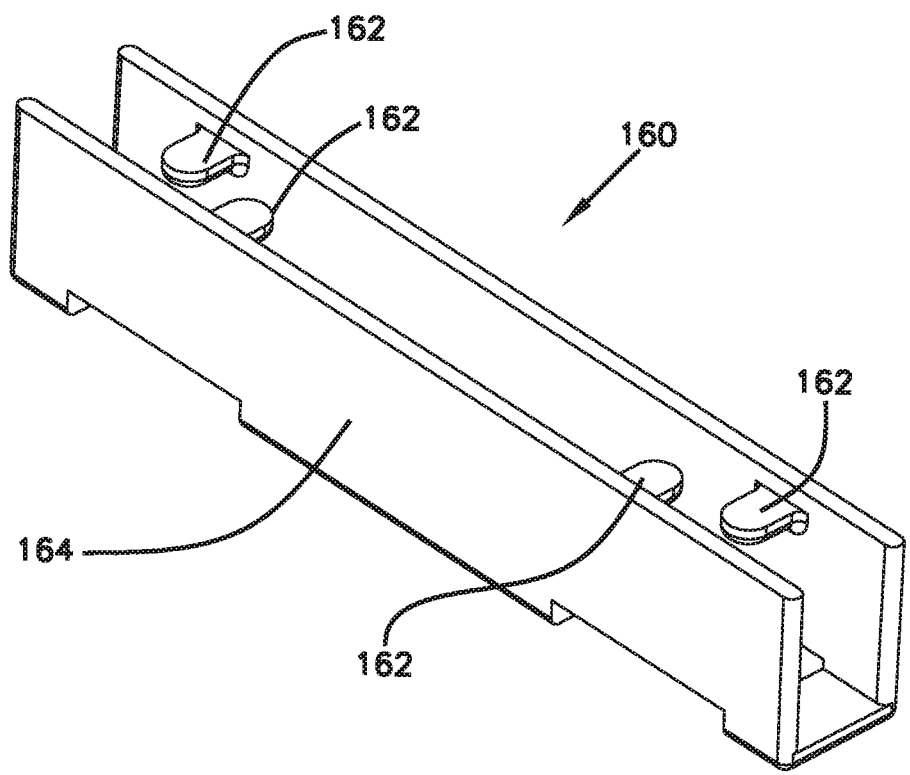
Figure 18:
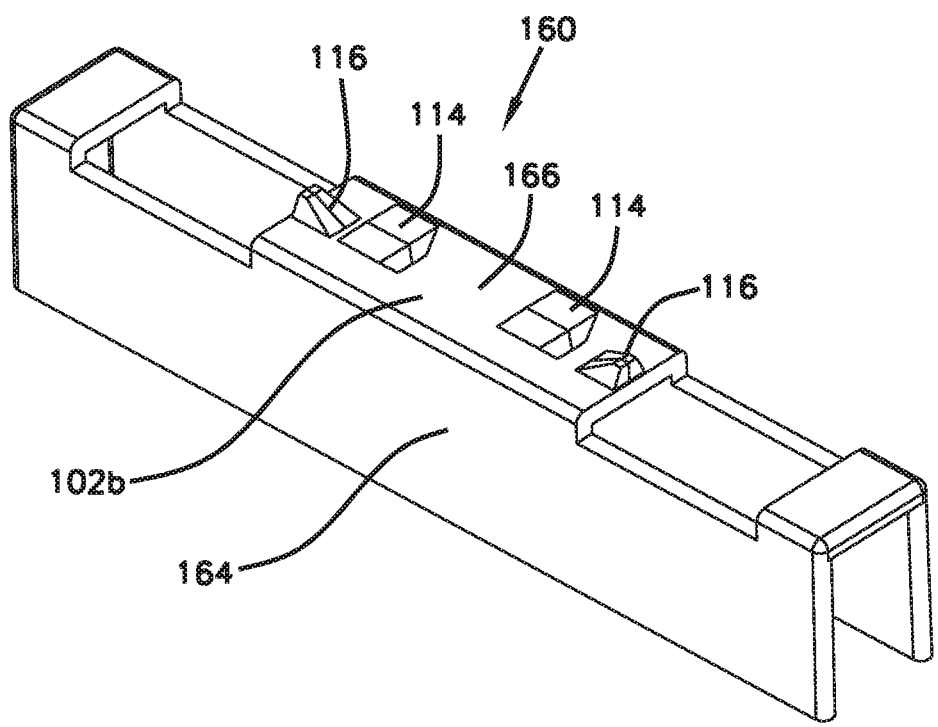
Figure 19:
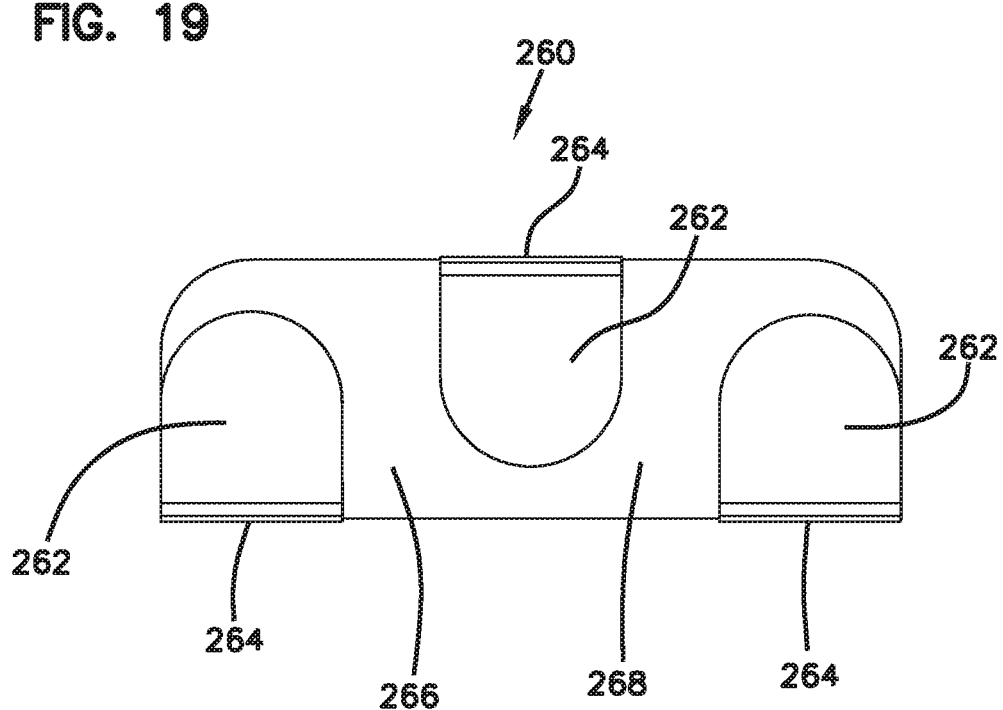
FIGS. 19-24 are various view of the fiber optic cable routing module used in the tray of FIGS. 7-11.
Figure 20:
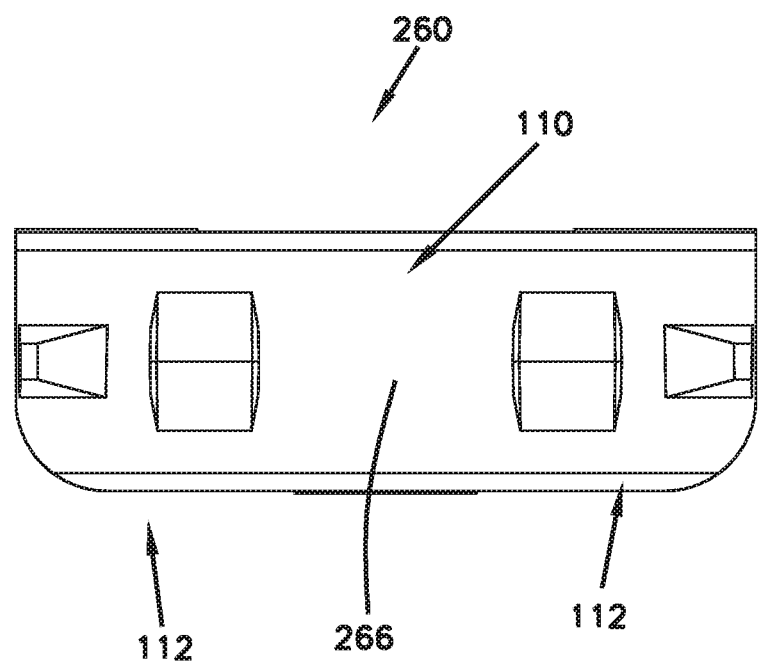
Figure 21:
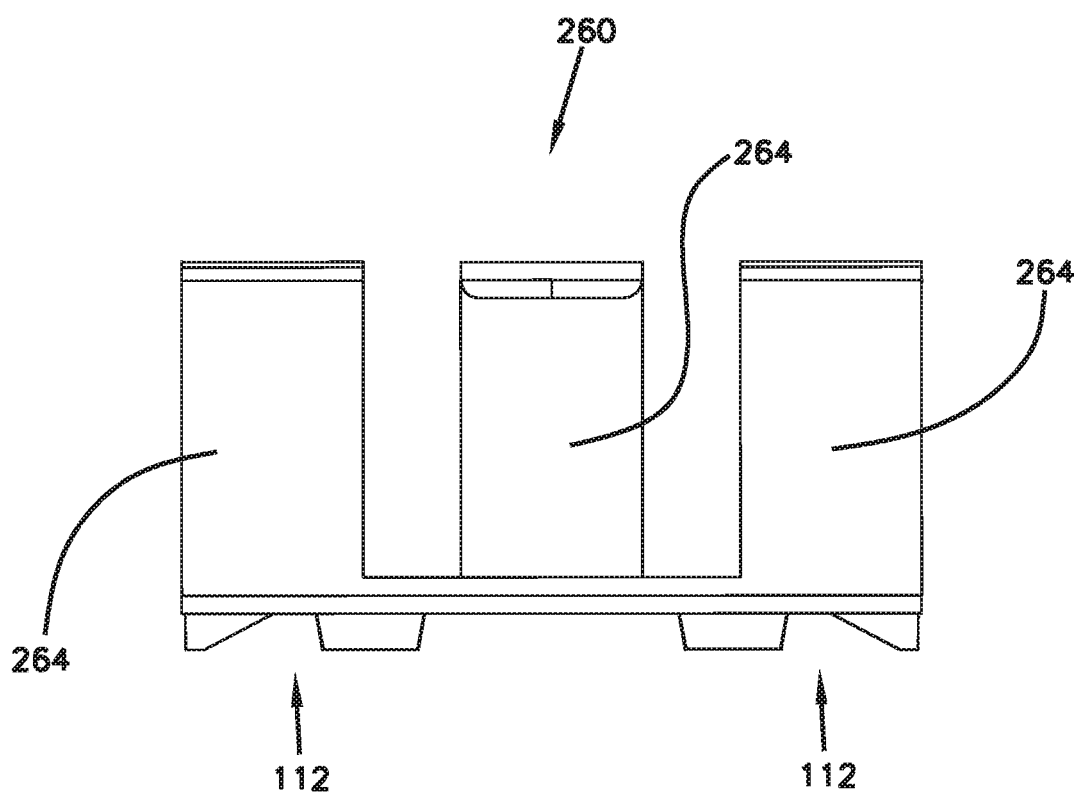
Figure 22:
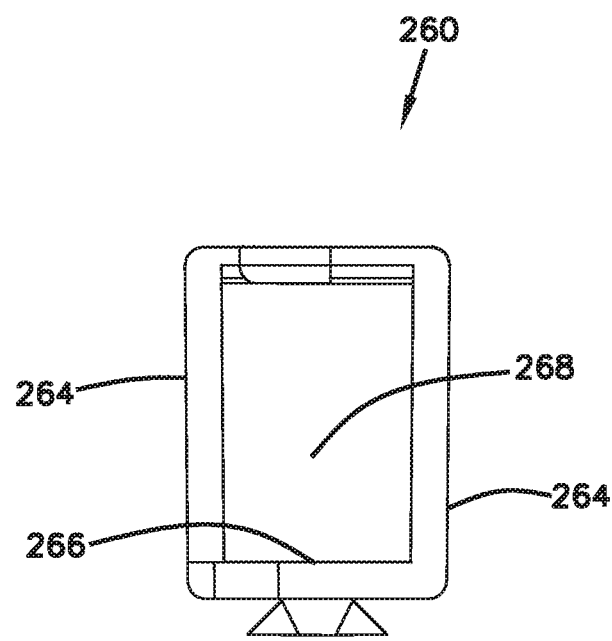
Figure 23:
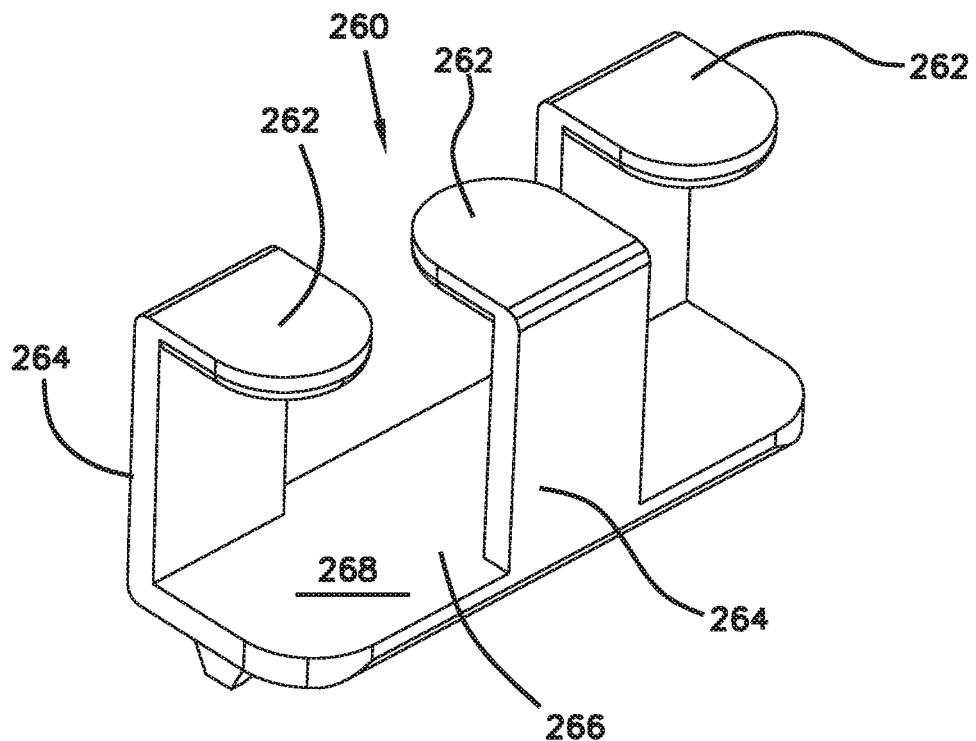
Figure 24:
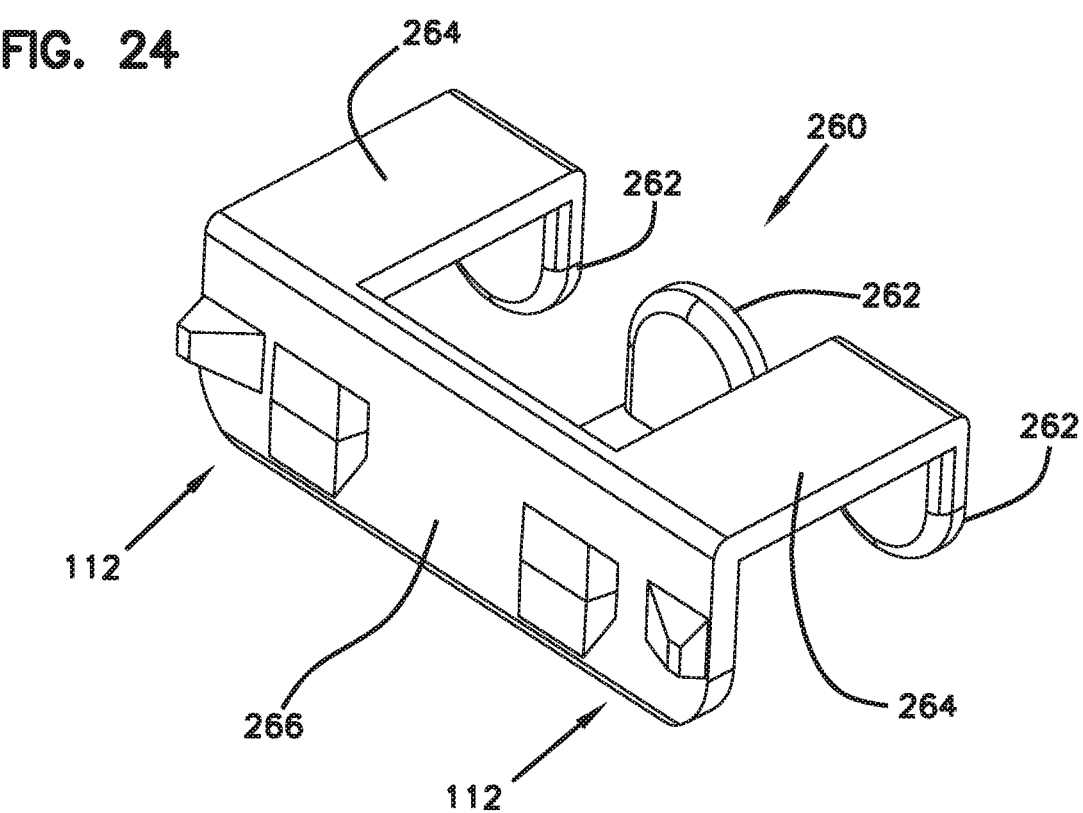
Figure 25:
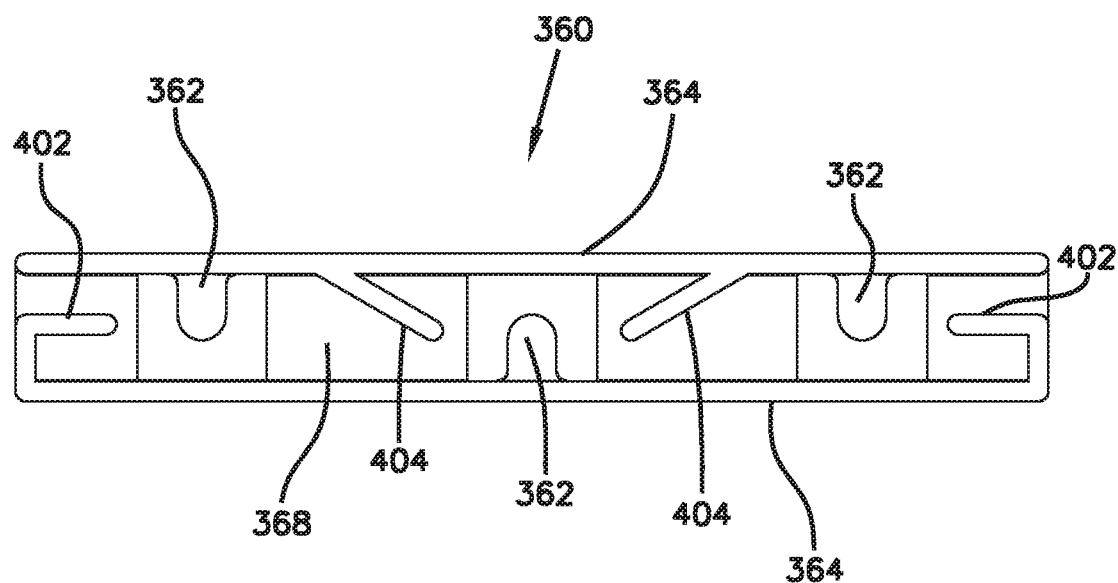
FIGS. 25-30 are various views of another fiber optic cable routing module useable in the trays of FIGS. 1-12.
Figure 26:
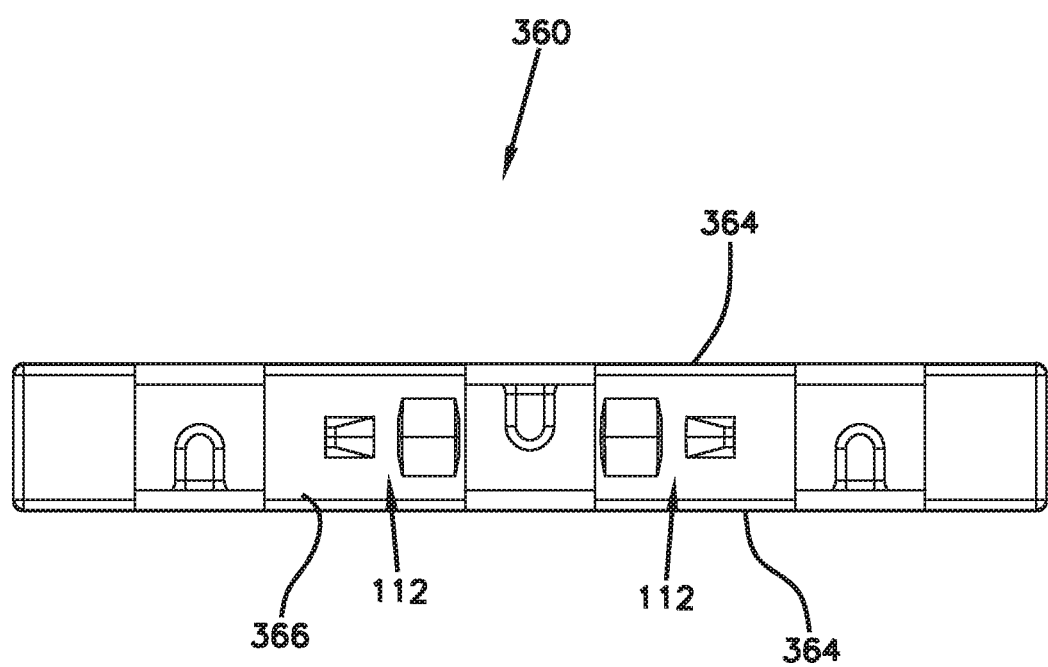
Figure 27:
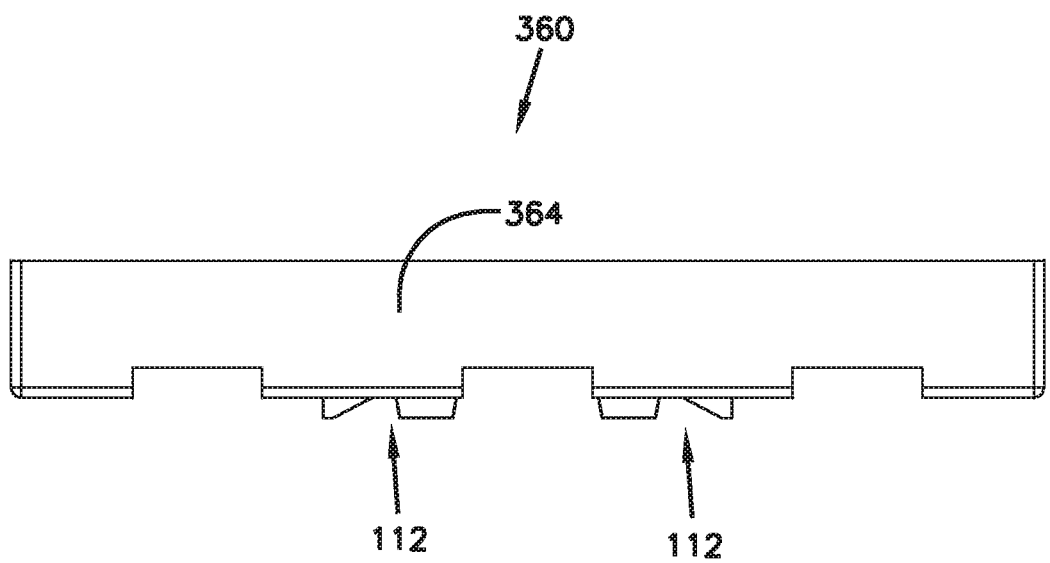
Figure 28:
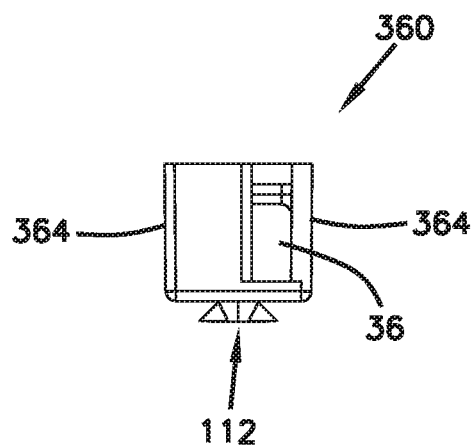
Figure 29:
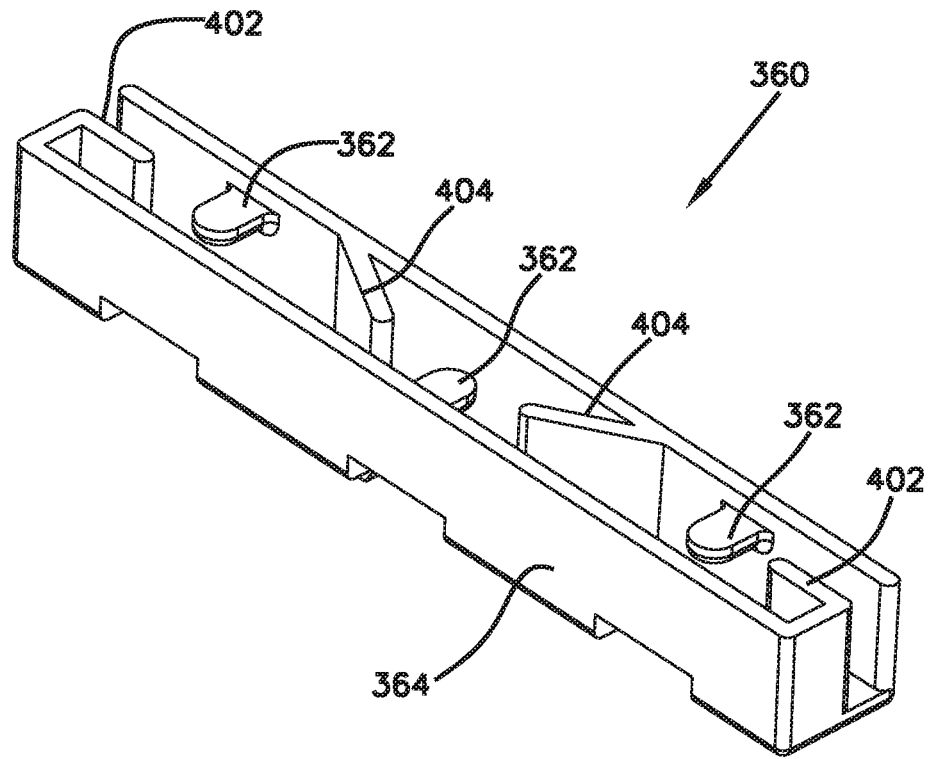
Figure 30:
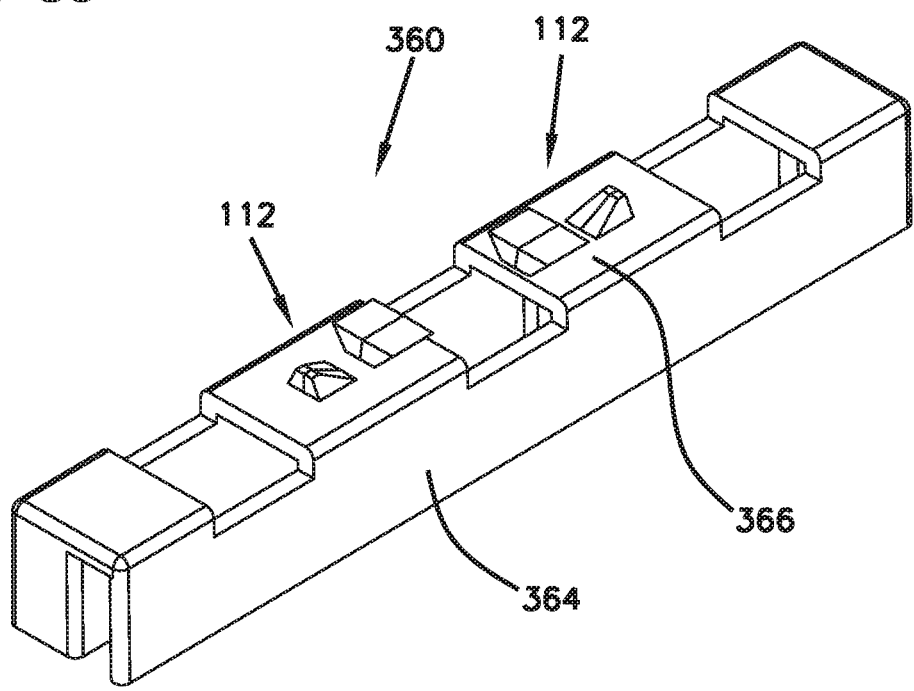

Referring now to FIG. 12, tray 12 includes a different arrangement of fiber splice holders 140, and fiber routing modules 160. As shown, two splice modules 140 are shown mounted side-by-side and two fiber routing modules 160 are shown mounted side-by-side. FIG. 12 illustrates the versatility of using the attachment arrangements 30 with appropriately sized modules and components to make for efficient storage and efficient cable routing.

FIGS. 13-18 show fiber routing module 160 having a base 166, sidewalls 164, overhanging tabs 162, and a fiber passage 168. Each splice holder 140 includes a plurality of channels 142 defined by a base 144, sidewalls 146, and inner dividers (see FIG. 3). Splice holder 240 is constructed similarly.

Referring now to FIGS. 19-24, fiber routing module 260 is shown in greater detail including a base 266, sidewalls 264, tabs 262, and defining a passage 268.

Referring now to FIGS. 25-30, a fiber routing module 360 is shown with a base 366, sidewalls 364, tabs 362, fiber guides 402, 404, which together define a passage for fiber.

Figure 31:
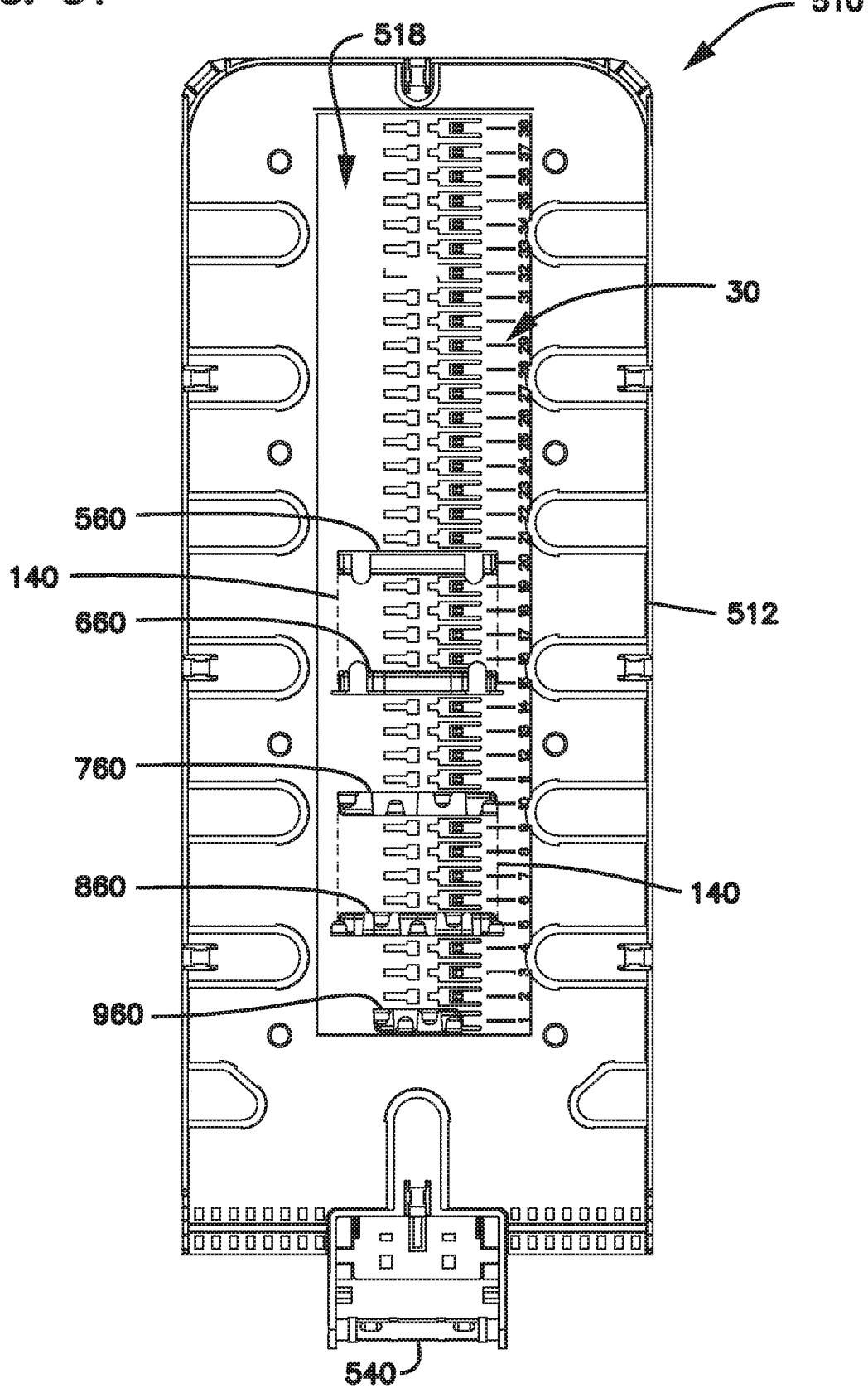
FIG. 31 is a top view of a third embodiment of a fiber optic tray.
Figure 32:
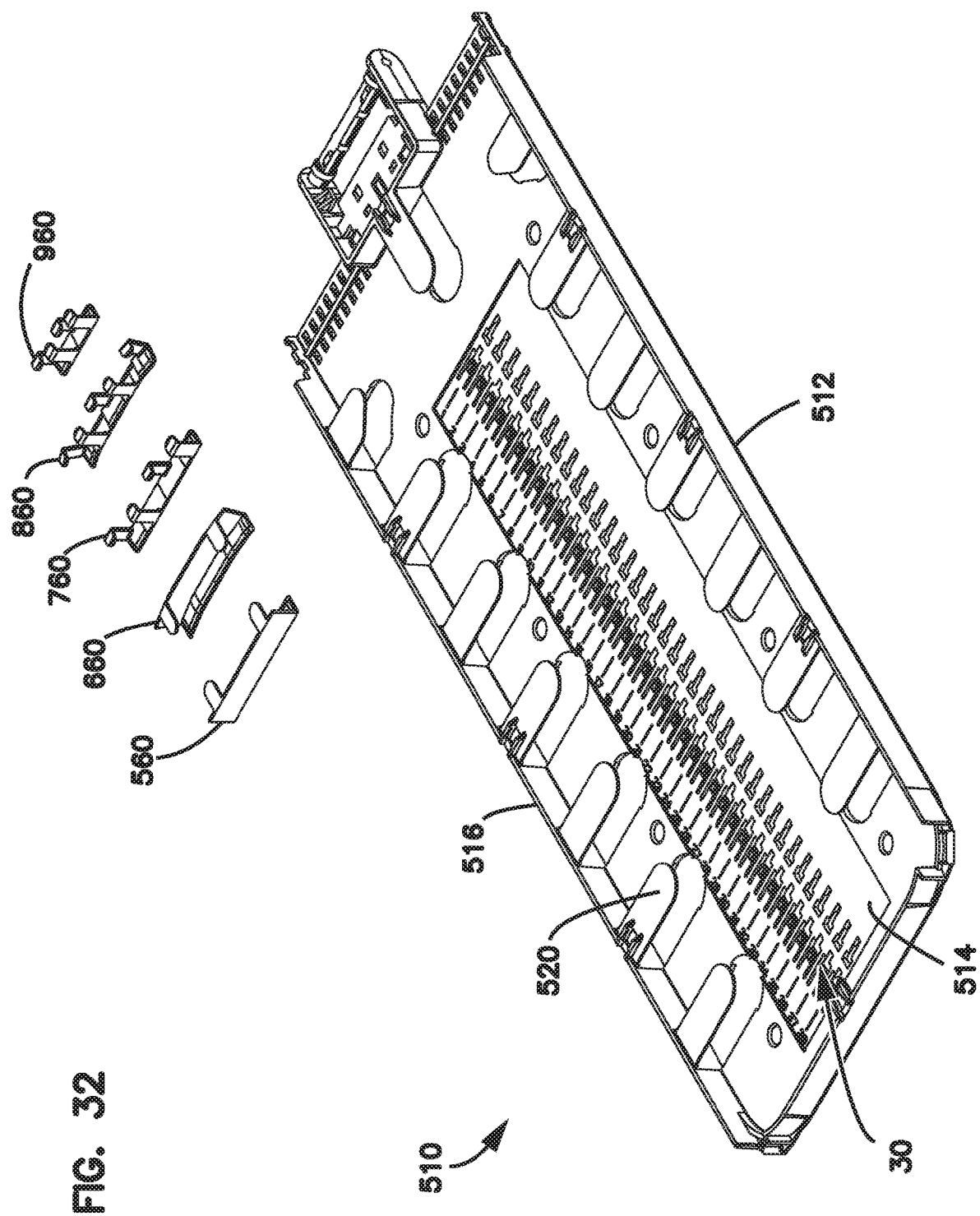
FIG. 32 is an exploded perspective view of the fiber optic tray of FIG. 31.
Figure 34:
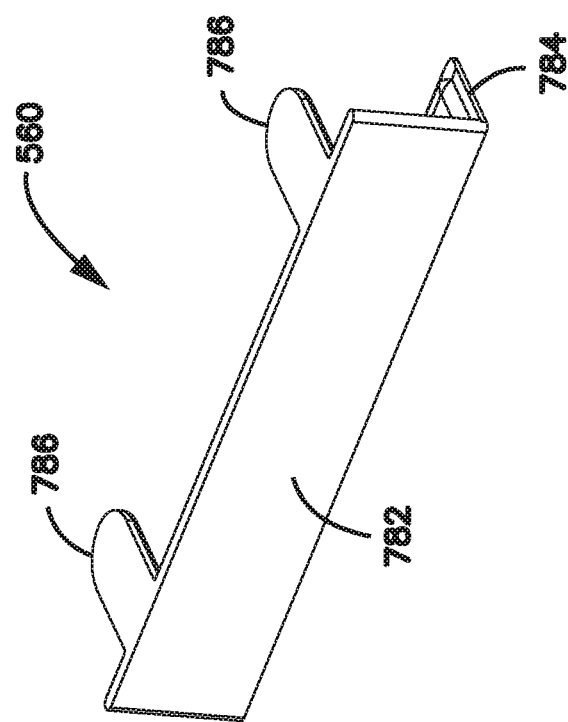
FIGS. 33-36 are various views of one of the fiber optic cable routing modules shown in the tray of FIGS. 31 and 32.
Figure 33:
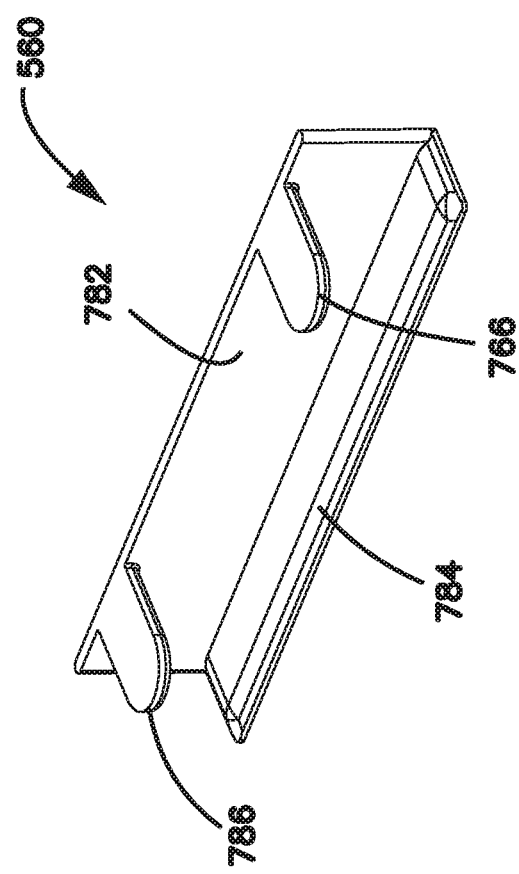
Figure 35:
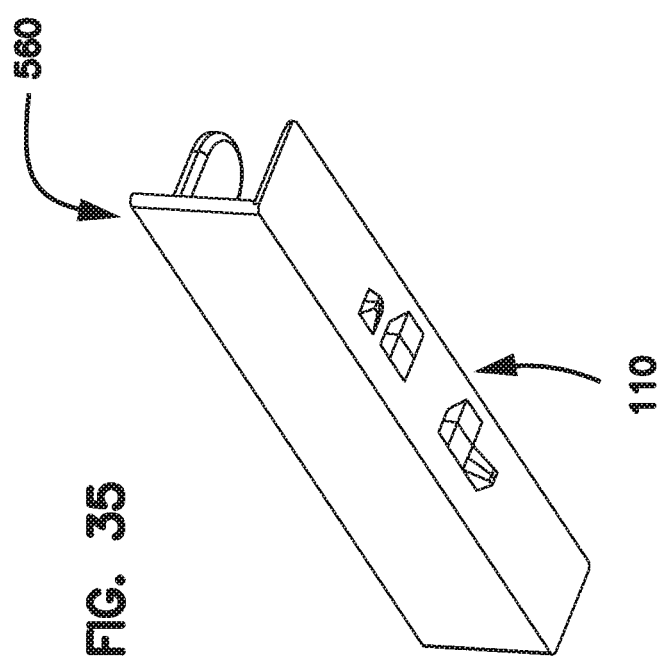
Figure 36:
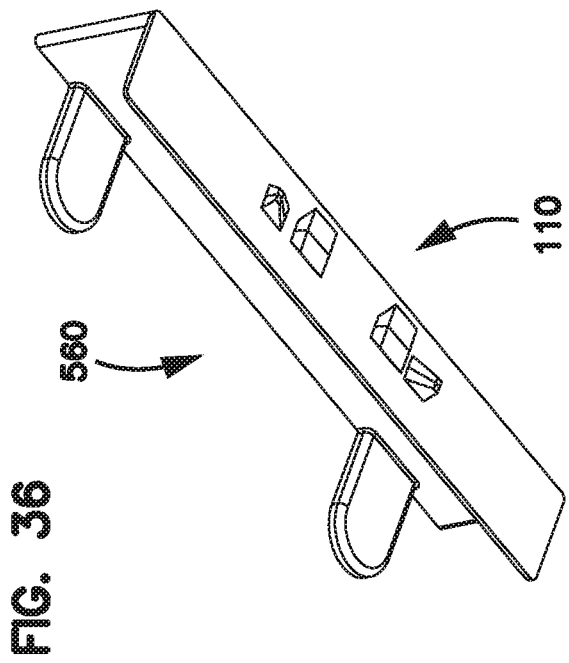
Figure 38:
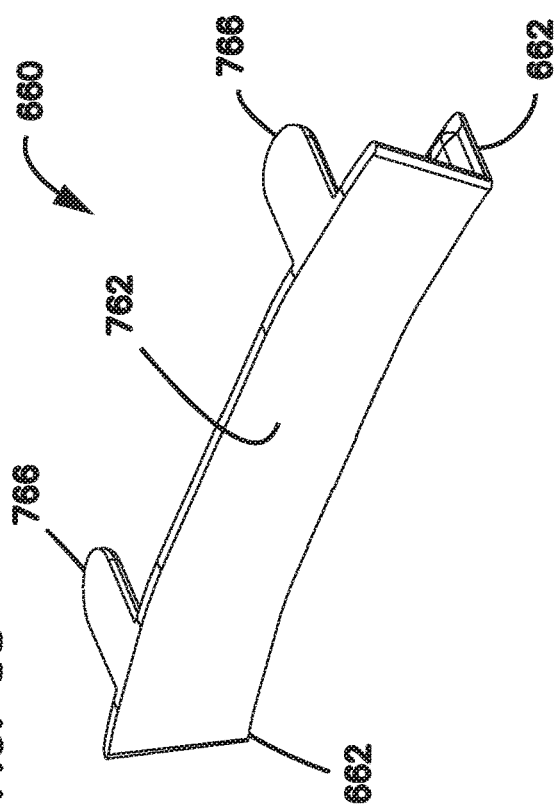
Figure 37:
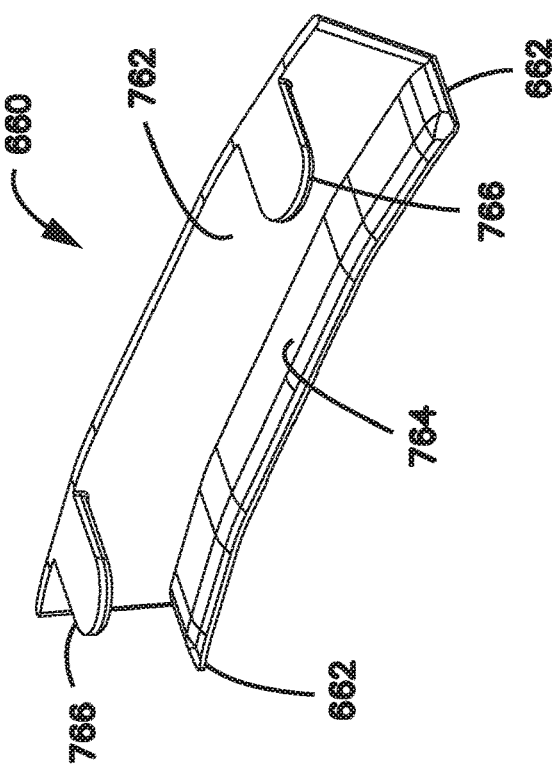
Figure 40:
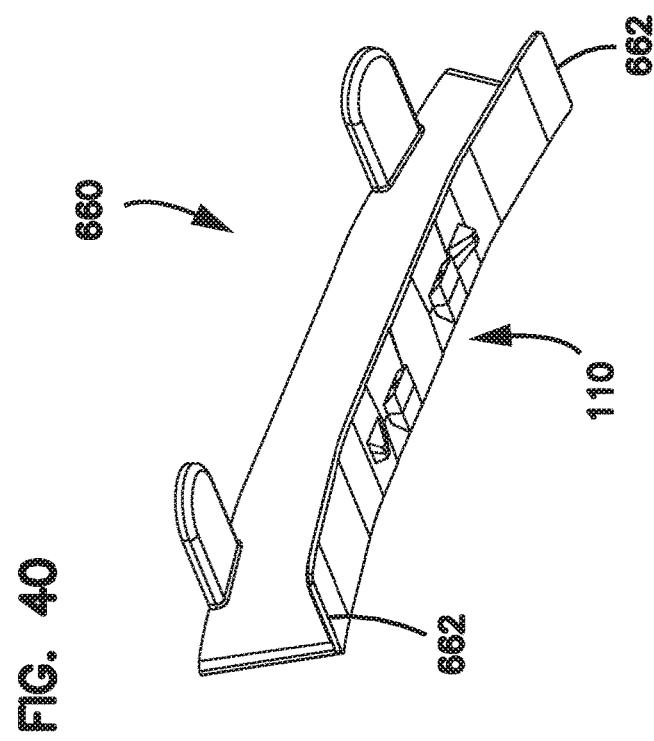
Figure 39:
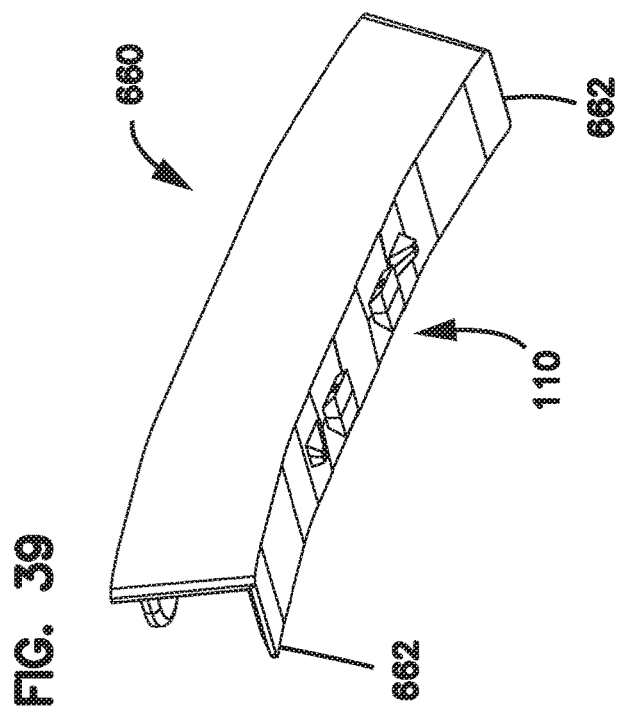
Figure 42:
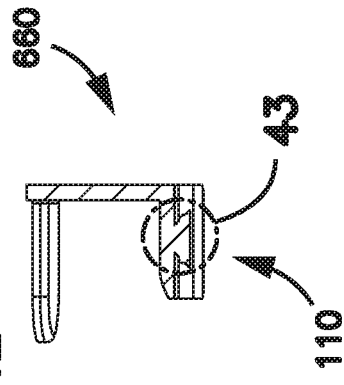
Figure 41:
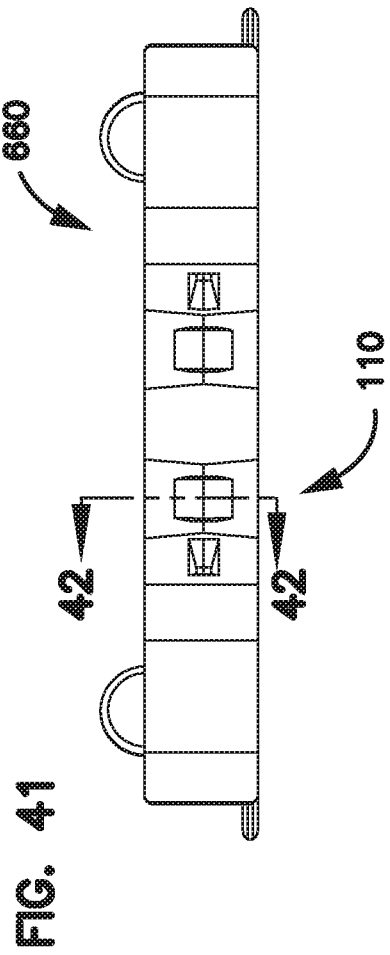
Figure 44:
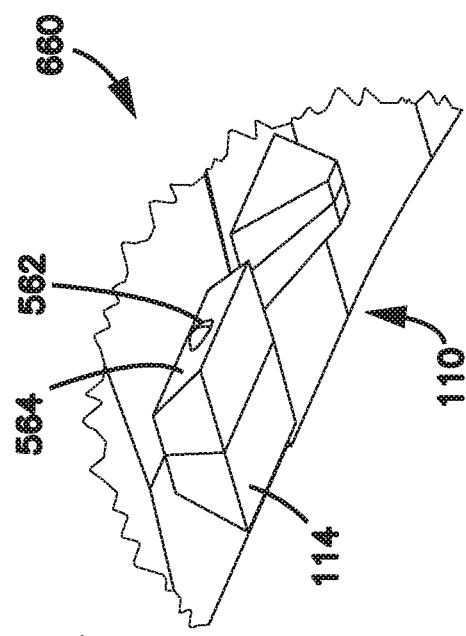
Figure 43:
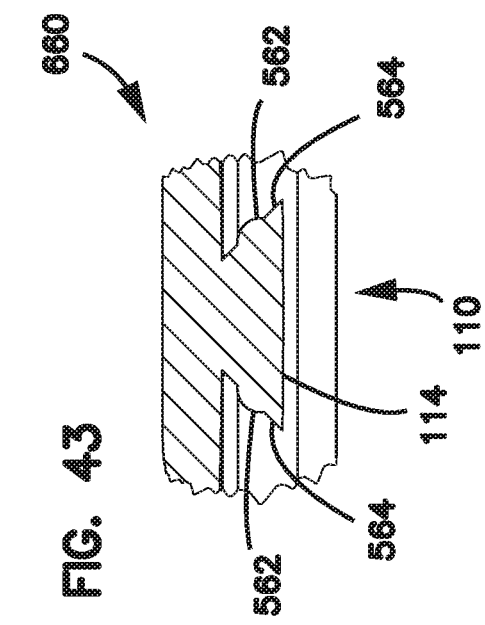
Figure 46:
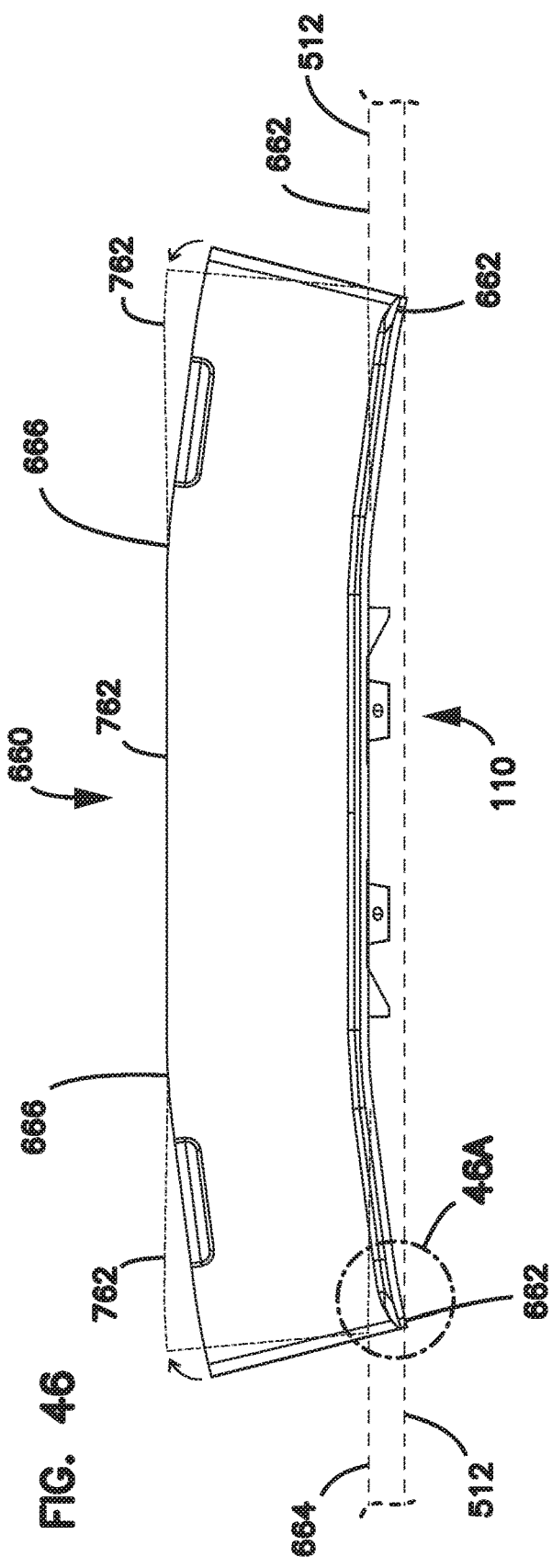
Figure 46A:
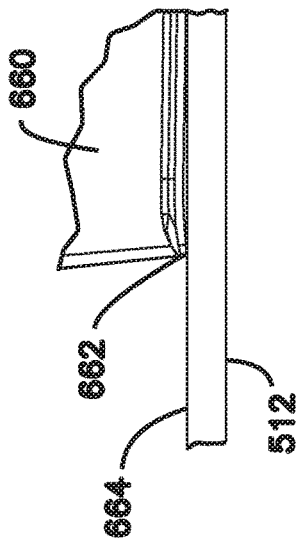

Referring to FIGS. 31 and 32, a telecommunications arrangement 510 is shown in various configurations. In one aspect, the telecommunications arrangement includes a tray 512 for storing telecommunications components and fiber optic cabling. As shown, the tray 512 includes a base wall 514 and a circumferential sidewall 516 to define an interior volume 518. To retain fiber optic cables within the tray, extension tabs or members 520 can be provided. In the example shown, a plurality of extension tabs 520 are provided extending from the sidewall 516 over the interior volume 18 and in a direction parallel to the base wall 514. Tray 512 defines a hinge pin 540 to allow the tray to be hinged to a support structure, such as a tower, possibly with other trays 512.

The tray 512 is similar in construction as tray 10, and is also shown as including a plurality of attachment arrangements 30 arranged in an array extending the length of the tray 512 along the base wall 514. The attachment arrangements 30 are configured to receive and retain various telecommunications components or devices, such as fiber routing modules, fiber optic adapters, splice holders, optical splitters, wavelength division multiplexers (WDM), and the like that are provided with an attachment arrangement compatible with the attachment arrangements 30. As shown, a splice holder device 140 and example of various fiber routing devices 560, 660, 760, 860, and 960 are useable in various combinations and in various selectable positions to define selectable fiber routing pathways. Devices 160, 260, 360 can also be used on tray 512 as desired, including the features noted below.

FIGS. 33-36 are various views of one of the fiber optic cable routing modules 560 shown in the tray of FIGS. 31 and 32.

FIGS. 37-46A are various views of another one of the fiber optic cable routing modules 660 shown in the tray of FIGS. 31 and 32.

Figure 47:
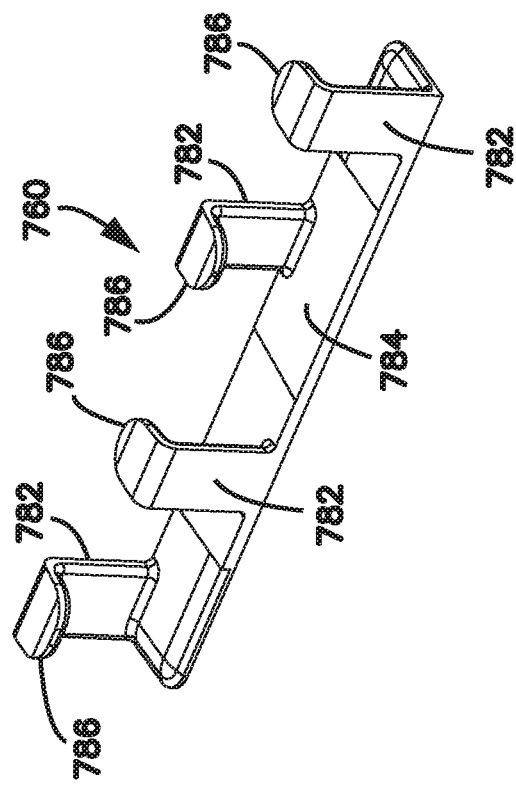
FIGS. 47 and 48 are two views of a further one of the fiber optic cable routing modules shown in the tray of FIGS. 31 and 32.
Figure 48:
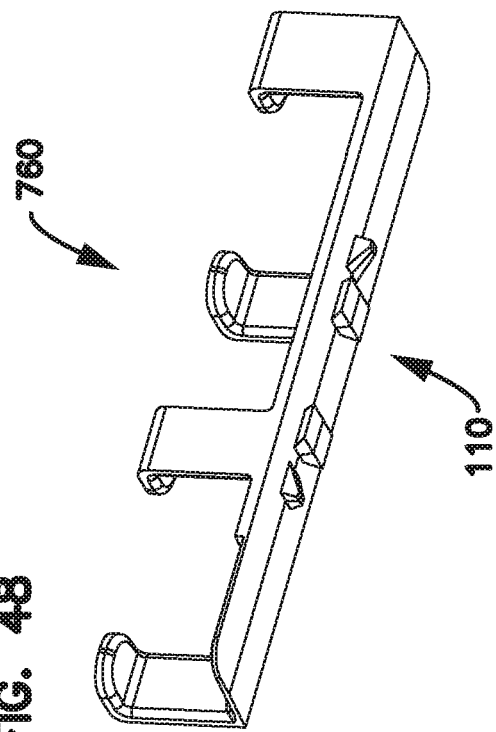
Figure 51:
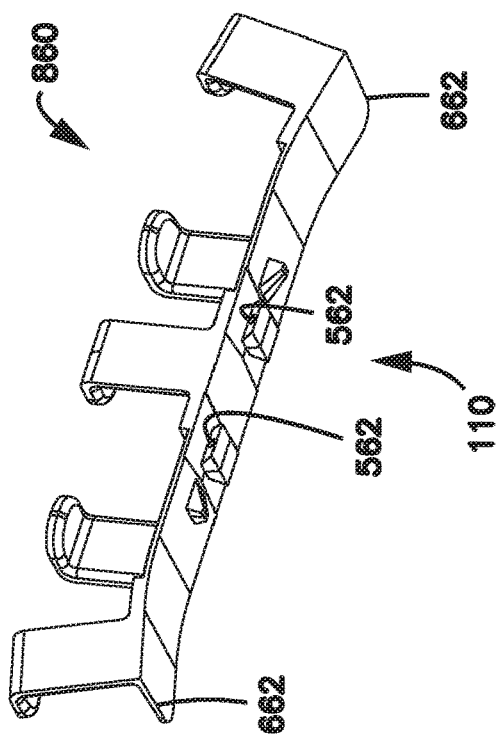
Figure 52:
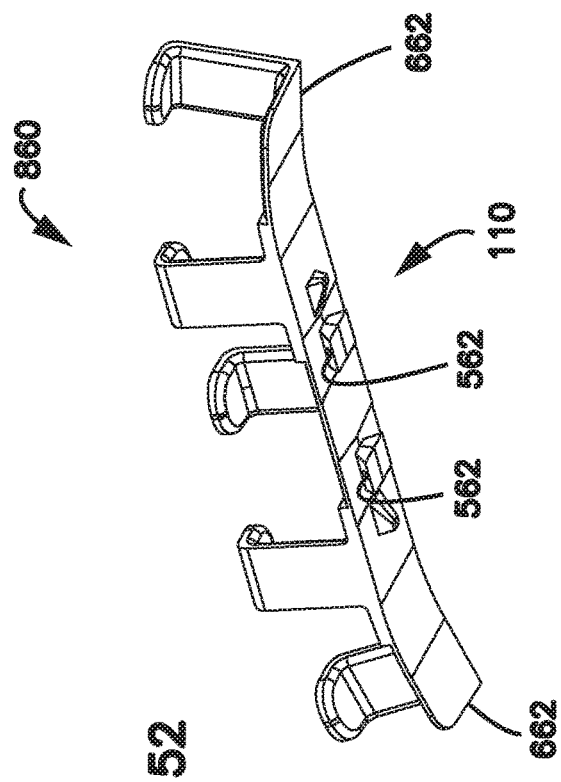

FIGS. 47 and 48 are two views of a further one of the fiber optic cable routing modules 760 shown in the tray of FIGS. 31 and 32.

FIGS. 49-52 are various views of a still further one of the fiber optic cable routing modules 860 shown in the tray of FIGS. 31 and 32.

Figure 54:
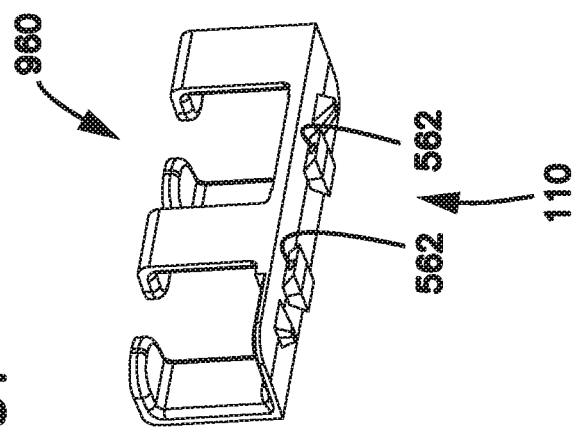
FIGS. 53 and 54 are two views of a still further one of the fiber optic cable routing modules shown in the tray of FIGS. 31 and 32.
Figure 53:
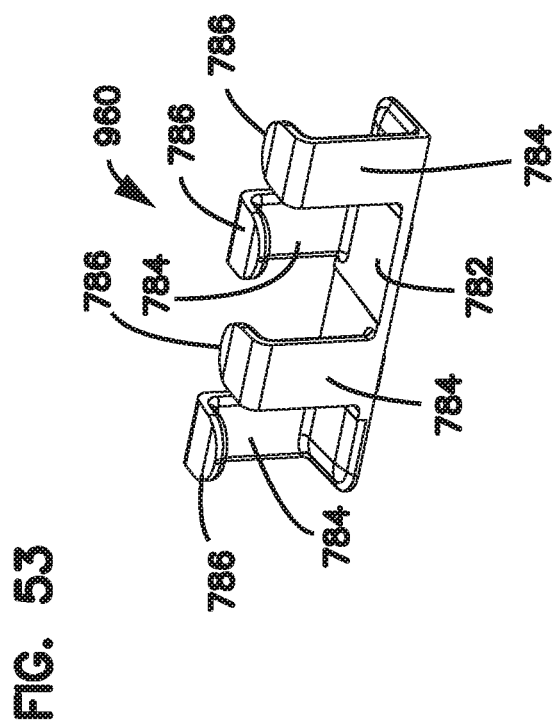

FIGS. 53 and 54 are two views of a still further one of the fiber optic cable routing modules 960 shown in the tray of FIGS. 31 and 32.

In one aspect, the attachment arrangement 110 on each device 140, 560, 660, 760, 860, and 960 is similar to that described above. One difference is shown with respect to the fiber routing devices 660, 860 and 960. The fiber routing devices 660, 860 and 960 can include one or bumps 562 on angled surfaces 564 of the dovetail structures 114. The bumps 562 on the attachment features to the tray 512 promote a tighter fit with the tray 512 to help reduce or eliminate a gap that might form due to tolerances from manufacture, and that gap could catch (trap) a fiber. In one example, the one or more bumps 562 can be provided on each surface 564 of the dovetail 114 of the attachment features which faces toward a base 568 of the management devices, and the component modules, e.g. splice holders. Each bump 562 can engage an angled surface 570 of the openings 32, 34 of tray 512. Bumps 582 and the respective angled surfaces 564, 570 draw the two parts closer together. Bumps 562 can function as crush ribs which allow the parts to engage one another and deform as needed to create the tighter fit without preventing the parts from being put together at all due to a tolerance misfit. See FIG. 45. Bumps 562 can take the form of partial spheres as shown. Other shapes include laterally extending, linear ribs extending parallel to the tray, or sharper pyramids or points. Shapes that are easily molded are preferred, but not required.

The management devices and component modules can also include a downward bias on the ends or edges to help reduce or eliminate a gap between the management devices and component modules and the tray 512 that could catch a fiber. Devices 660 and 860 include ends 662 that are bendable upward around areas 666 so as to stay engaged with the top surface 664 of the tray 512. See FIGS. 46 and 46A. The bendable ends 662 do not affect the middle areas where the attachment arrangement 110 is located.

As shown in the FIGS. 31 and 32, tray 512 is shown with a plurality of fiber optic splice holder modules 140 mounted to tray 512, as examples of just one arrangement. Any combination of plurality of fiber routing modules noted above can be used as desired. The fiber routing modules can be positioned as desired on tray 512 for managing fiber optic cables extending to and from the splices of the splice holders 140 or any other devices on tray 512.

Fiber routing modules can have one generally planar exterior side wall 762, a base 764, and top projections or tabs 766 over the base (see modules 560, 660); or side projections 782 in two rows extending from a base 784, and each with a top projection or tab 786 over the base (see modules 760, 860, and 960). Two sidewalls 762 can be provided if desired. Single rows of side projections 782 can be provided if desired. An inner trough area is constructed to retain one or more fibers passing through the interior passage.

The management devices 160, 260, 360, 560, 660, 760, 860, and 960 can be provided in a variety of lengths. In one example, 560, 660, 760, 860 can be as long or longer relative to the component modules 140 or other components to help ensure that a fiber does not catch on the edge of the component modules or other component, or to help ensure that a fiber does not go under the component modules or other component. See FIG. 31.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. A telecommunications assembly comprising:
   a tray defining a base wall and a side wall extending from the base wall;
   a splice holder module mounted to the base wall in one of a plurality of selectable positions laterally on the base wall; and
   a fiber routing module mounted to the base wall in a side-by-side arrangement with the splice holder module in one of a plurality of selectable positions laterally on the base wall, wherein the fiber routing module and the splice holder module have upright planar walls that face each other, and wherein the fiber routing module includes an inner passageway with at least one overhanging tab;
   wherein a plurality of splice holder modules and a plurality of fiber routing modules are provided mounted to the tray;
   wherein each of the plurality of splice holder modules and each of the plurality of fiber routing modules include a dovetail mounting feature for connecting to the base wall of the tray;
   wherein each of the plurality of splice holder modules and each of the plurality of fiber routing modules are selectably mountable in a plurality of different locations on the base wall to define a plurality of different fiber routing pathways.

2. The telecommunications assembly of claim 1, wherein each splice holder module and each fiber routing module include one or more bumps on an attachment feature to promote a tighter fit with the base wall of the tray to help reduce or eliminate a gap that could catch a fiber, wherein the one or more bumps are provided on a surface of a dovetail of the attachment feature which faces toward a base of the splice holder module or the fiber routing module.

3. The telecommunications assembly of claim 1, wherein each splice holder module and each fiber routing module include a downward bias on downward facing ends or edges to help reduce or eliminate a gap between the base wall of the tray and the splice holder module or the fiber routing module that could catch a fiber.

4. The telecommunications assembly of claim 1, wherein each fiber routing module is as long or longer relative to an adjacent splice holder module to help ensure that a fiber does not catch on an edge of the splice holder module, or to help ensure that the fiber does not go under the splice holder module or the fiber routing module or other component.

5. The telecommunications assembly of claim 1, wherein the upright planar walls of the fiber routing module are comprised of at least one side wall projection extending into the at least one overhanging tab, wherein one or more openings in the upright planar walls of the fiber routing module are defined between two adjacent side wall projections.

6. The telecommunications assembly of claim 1, wherein the fiber routing module includes a single upright planar wall positioned along one side of the fiber routing module, with the opposite side of the fiber routing module being open.

7. A telecommunications assembly comprising:
   a tray defining a base wall and a side wall extending from the base wall;
   a splice holder module mounted to the base wall in one of a plurality of selectable positions laterally on the base wall; and
   a fiber routing module mounted to the base wall in a side-by-side arrangement with the splice holder module, in one of a plurality of selectable positions laterally on the base wall, wherein the fiber routing module is as long or longer relative to the splice holder module to help ensure that a fiber does not catch on an edge of the splice holder module, or to help ensure that the fiber does not go under the splice holder module;
   wherein the splice holder module and the fiber routing module each include one or more bumps on an attachment feature to promote a tighter fit with the base wall of the tray to help reduce or eliminate a gap that could catch the fiber, wherein the one or more bumps are provided on a surface of a dovetail of the attachment feature which faces toward a base of the splice holder module or the fiber routing module.

8. The telecommunications assembly of claim 7, wherein each of the splice holder module and the fiber routing module includes a dovetail mounting feature for connecting to the base wall of the tray.

9. The telecommunications assembly of claim 7, wherein a plurality of splice holder modules and fiber routing modules are selectably mountable in a plurality of locations to define different fiber routing pathways.

10. The telecommunications assembly of claim 7, wherein the splice holder module and the fiber routing module each include a downward bias on downward facing ends or edges to help reduce or eliminate a gap between the base wall of the tray and the splice holder module or the fiber routing module that could catch the fiber.

11. A telecommunications assembly comprising:
a tray defining a base wall and a side wall extending from the base wall;
a splice holder module mounted to the base wall;
a fiber routing module mounted to the base wall, wherein the fiber routing module includes an inner passageway with at least one overhanging tab;
wherein each of the splice holder module and the fiber routing module includes a dovetail mounting feature for connecting to the base wall of the tray; and
wherein the splice holder module and/or the fiber routing module includes one or more bumps on an attachment feature to promote a tighter fit with the base wall of the tray to help reduce or eliminate a gap that could catch a fiber, wherein the one or more bumps are provided on a surface of the dovetail mounting feature which faces toward a base of the splice holder module or the fiber routing module.

12. The telecommunications assembly of claim 11, wherein a plurality of splice holder modules and a plurality of fiber routing modules are selectably mountable in a plurality of locations to define different fiber routing pathways.

13. The telecommunications assembly of claim 11, wherein the splice holder module or the fiber routing module include a downward bias on ends or edges to help reduce or eliminate the gap between the base wall of the tray and the splice holder module or the fiber routing module that could catch the fiber.

14. A telecommunications assembly comprising:
a tray defining a base wall and a side wall extending from the base wall, the base wall having an upper surface;
a splice holder module mounted to the base wall, the splice holder module including a lower surface engaged with the upper surface of the base wall;
a fiber routing module mounted to the base wall, wherein the fiber routing module includes an inner passageway with at least one overhanging tab, the fiber routing module including a lower surface engaged with the upper surface of the base wall; and
wherein the splice holder module and the fiber routing module each include a downward bias on opposite ends to help reduce or eliminate a gap between the upper surface of the base wall of the tray and the lower surface of the splice holder module and the lower surface of the fiber routing module that could catch a fiber;
wherein the fiber routing module includes a plurality of internal fiber guides restricting the inner passageway.

15. The telecommunications assembly of claim 14, wherein a plurality of splice holder modules and a plurality of fiber routing modules are selectably mountable in a plurality of locations to define different fiber routing pathways.

16. A telecommunications assembly comprising:
a tray defining a base wall and a side wall extending from the base wall;
a splice holder module mounted to the base wall in one of a plurality of selectable positions laterally on the base wall; and
a fiber routing module mounted to the base wall in a side-by-side arrangement with the splice holder module in one of a plurality of selectable positions laterally on the base wall, wherein the fiber routing module and the splice holder module have upright planar walls that face each other, and wherein the fiber routing module includes an inner passageway with at least one overhanging tab;
wherein the splice holder module or the fiber routing module include one or more bumps on an attachment feature to promote a tighter fit with the base wall of the tray to help reduce or eliminate a gap that could catch a fiber, wherein the one or more bumps are provided on a surface of a dovetail of the attachment feature which faces toward a base of the splice holder module or the fiber routing module.

* * * * *